(12) United States Patent
Kadowaki

(10) Patent No.: US 7,289,239 B2
(45) Date of Patent: Oct. 30, 2007

(54) APPARATUS FOR CONTROLLING IMAGE PROCESSING AND A METHOD FOR CONTROLLING IMAGE PROCESSING

(75) Inventor: Toshihiro Kadowaki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 10/909,432

(22) Filed: Aug. 3, 2004

(65) Prior Publication Data

US 2005/0007633 A1 Jan. 13, 2005

Related U.S. Application Data

(63) Continuation of application No. 08/745,152, filed on Nov. 7, 1996, now Pat. No. 6,813,038.

(30) Foreign Application Priority Data

Nov. 8, 1995 (JP) ................... 7-289779

(51) Int. Cl.
*G06F 15/00* (2006.01)
*G03G 15/00* (2006.01)
(52) U.S. Cl. .................. 358/1.18; 358/1.15; 358/1.13; 358/450; 399/82; 399/85
(58) Field of Classification Search ............... 358/1.18, 358/1.17, 1.15, 1.12, 1.13, 450; 399/82, 399/85
See application file for complete search history.

(56) References Cited

U.S. PATENT DOCUMENTS

| 5,081,494 A | 1/1992 | Reed et al. ................. 355/202 |
| 5,493,635 A | 2/1996 | Brindle et al. ............... 395/114 |
| 5,640,495 A | 6/1997 | Colbert et al. ............... 395/112 |
| 5,715,381 A | 2/1998 | Hamilton .................... 358/1.15 |
| 5,768,488 A * | 6/1998 | Stone et al. ................ 358/1.18 |
| 5,791,790 A | 8/1998 | Bender et al. ............... 395/115 |
| 5,923,013 A | 7/1999 | Suzuki et al. ................ 358/1.1 |
| 5,999,707 A * | 12/1999 | Taniguchi et al. ......... 358/1.15 |

FOREIGN PATENT DOCUMENTS

| EP | 0 473 016 | 3/1992 |
| EP | 0 529808 | 3/1993 |
| EP | 0 606 131 | 7/1994 |
| EP | 0 621 530 | 10/1994 |
| JP | 60-48055 | 3/1985 |
| JP | 62-197849 | 9/1987 |
| JP | 2-51170 | 2/1990 |
| JP | 5-69604 | 3/1993 |

(Continued)

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

An apparatus for controlling image processing comprises means for receiving printing jobs, means for spooling the jobs received, means for joining jobs to make a plurality of the printing jobs retained in the spooling means one printing job by joining them, and means for transferring the joined printing job to a printer side. With a structure thus arranged, the various processes, which have been applied per job in a conventional art, can be applied to a plurality of printing jobs as a whole by joining and regarding them as one job.

26 Claims, 24 Drawing Sheets

FOREIGN PATENT DOCUMENTS

| | | |
|---|---|---|
| JP | 5-153370 | 6/1993 |
| JP | 5-177899 | 7/1993 |
| JP | 5-210720 | 8/1993 |
| JP | 5-216606 | 8/1993 |
| JP | 5-308493 | 11/1993 |
| JP | 6-297781 | 10/1994 |
| JP | 6-340127 | 12/1994 |
| JP | 7-115487 | 5/1995 |
| JP | 7-121328 | 5/1995 |
| JP | 7-131618 | 5/1995 |
| JP | 7-160452 | 6/1995 |
| WO | WO92/11596 | 7/1992 |
| WO | WO95/00898 | 1/1995 |

\* cited by examiner

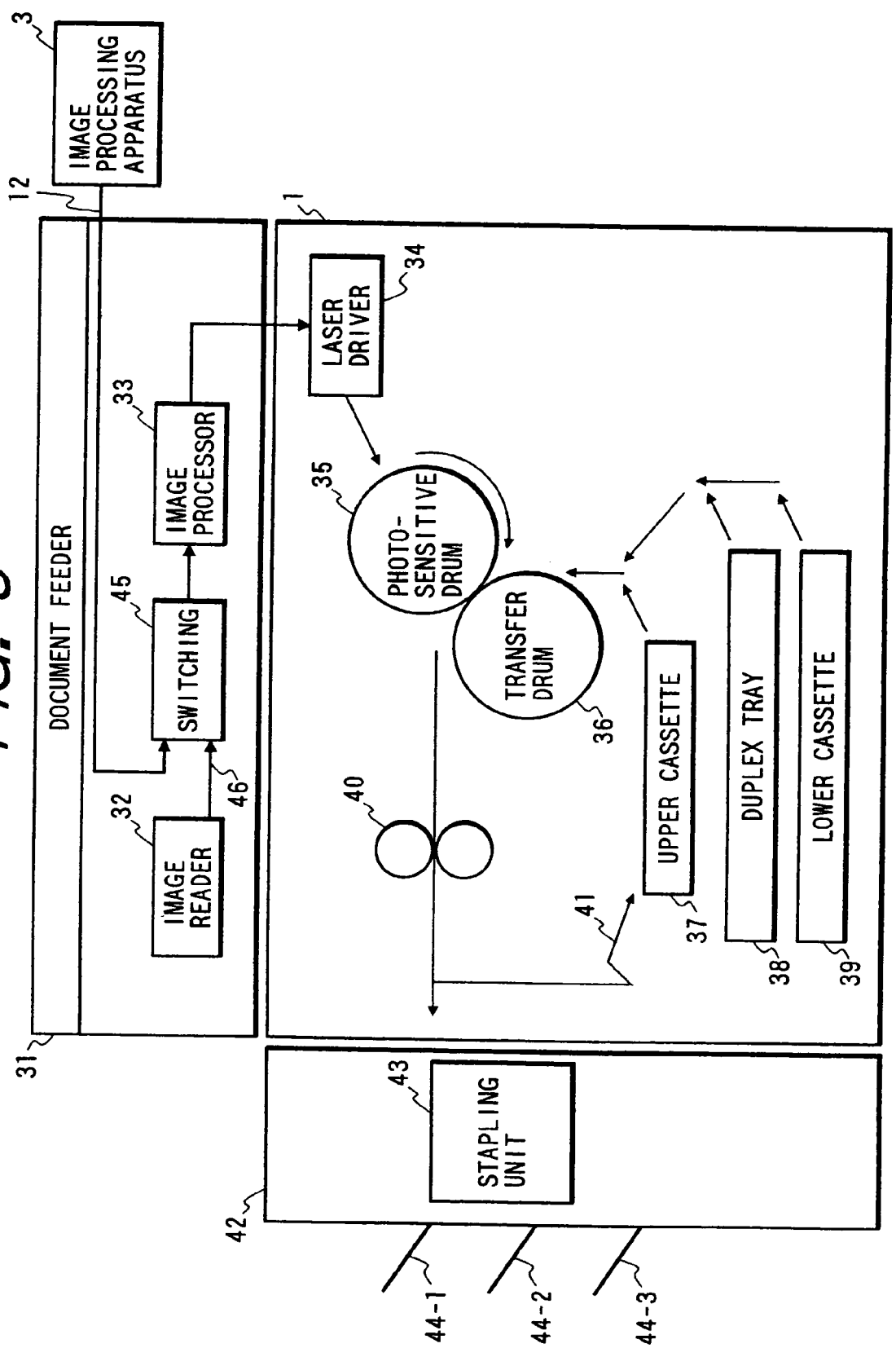

FIG. 4A
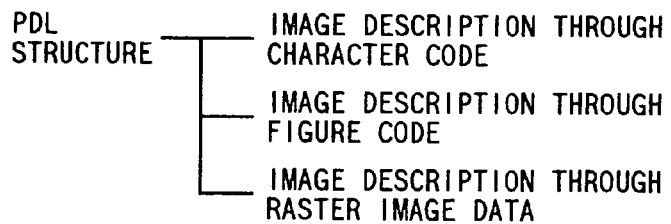
FIG. 4B
```
CHAR_COLOR = {0.0, 0.0, 0.0};        ←L100
STRING1 = "IC";                       ←L101
PUT_CHAR (0.0, 0.0, 0.3, 0.1, STRING1);  ←L102
```
FIG. 4C
```
LINE_COLOR = {1.0, 0.0, 0.0};         ←L103
PUT_LINE (0.9, 0.0, 0.9, 1.0, 0.1);   ←L104
```
FIG. 4D
```
IMAGE1 = {RGB, 8, 5, 5, R0, G0, B0;   ←L105
                       R1, G1, B1
                       !
                       R24, G24, B24};
PUT_IMAGE (0.0, 0.5, 0.5, 0.5, IMAGE1);  ←L106
```
FIG. 4E
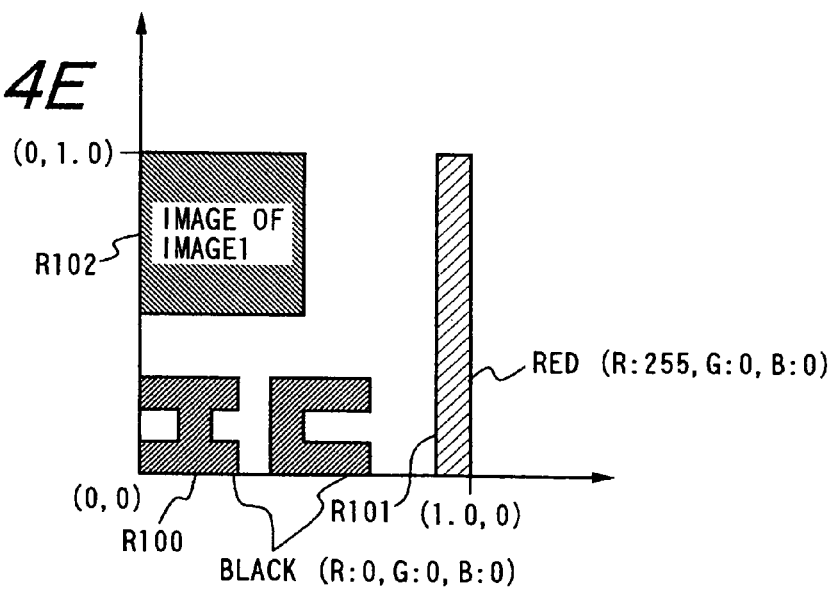
FIG. 4F
```
N1N1 = 4;              ←L107
DUPLEX = TRUE;         ←L108
SORT = TRUE;           ←L109
STAPLE = TRUE;         ←L110
COPY = 4;              ←L111
```

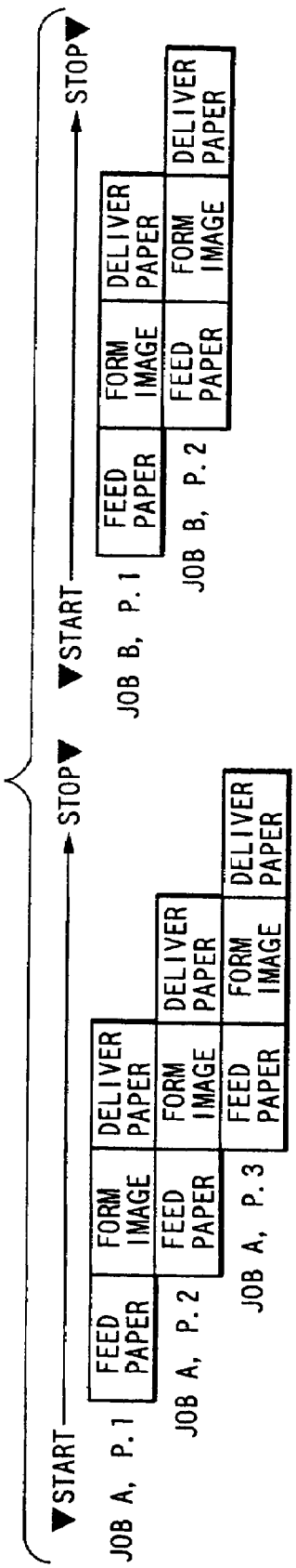
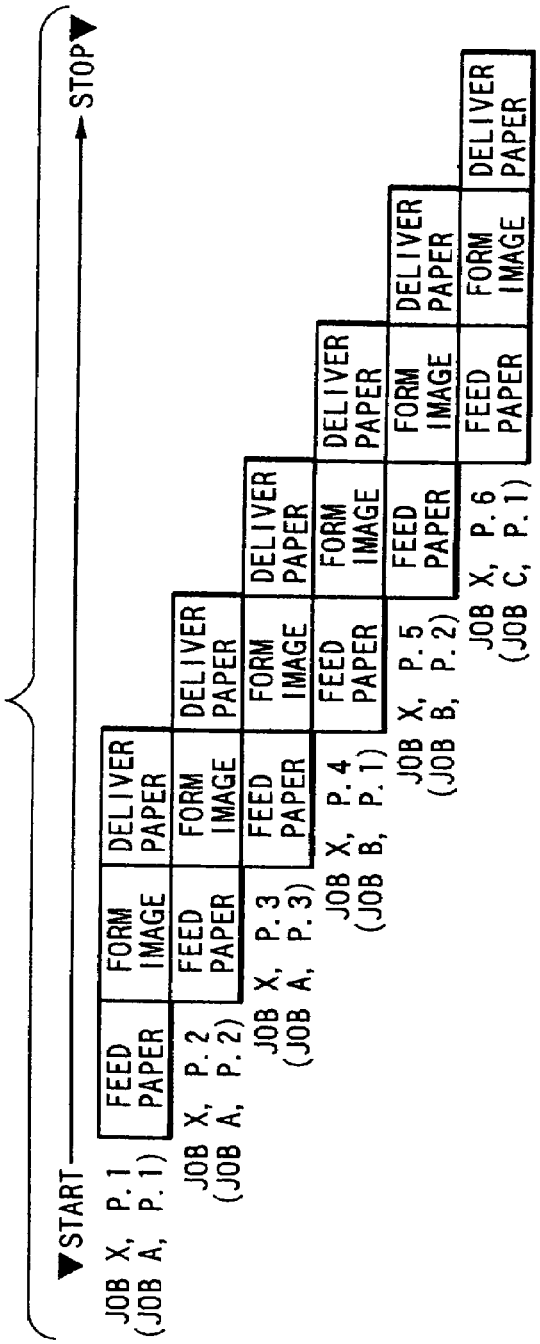

FIG. 7A

| RIGHT | REVERSE | RIGHT | REVERSE | RIGHT | REVERSE |
|---|---|---|---|---|---|
| JOB A, P.1 | JOB A, P.2 | JOB A, P.3 | BLANK | JOB B, P.1 | JOB B, P.2 |

| RIGHT | REVERSE |
|---|---|
| JOB C, P.1 | BLANK |

FIG. 7B

| RIGHT | REVERSE | RIGHT | REVERSE |
|---|---|---|---|
| JOB X, P.1 (JOB A, P.1) | JOB X, P.2 (JOB A, P.2) | JOB X, P.3 (JOB A, P.3) | JOB X, P.4 (JOB B, P.1) |

| RIGHT | REVERSE |
|---|---|
| JOB X, P.6 (JOB B, P.2) | JOB X, P.6 (JOB C, P.1) |

FIG. 8A

| JOB A, P. 1 | JOB A, P. 2 |
| --- | --- |
| JOB A, P. 3 | BLANK |

| JOB B, P. 1 | JOB B, P. 2 |
| --- | --- |
| BLANK | BLANK |

| JOB C, P. 1 | BLANK |
| --- | --- |
| BLANK | BLANK |

FIG. 8B

| JOB X, P. 1 (JOB A, P. 1) | JOB X, P. 2 (JOB A, P. 2) |
| --- | --- |
| JOB X, P. 3 (JOB A, P. 3) | JOB X, P. 4 (JOB B, P. 1) |

| JOB X, P. 5 (JOB B, P. 2) | JOB X, P. 6 (JOB C, P. 1) |
| --- | --- |
| BLANK | BLANK |

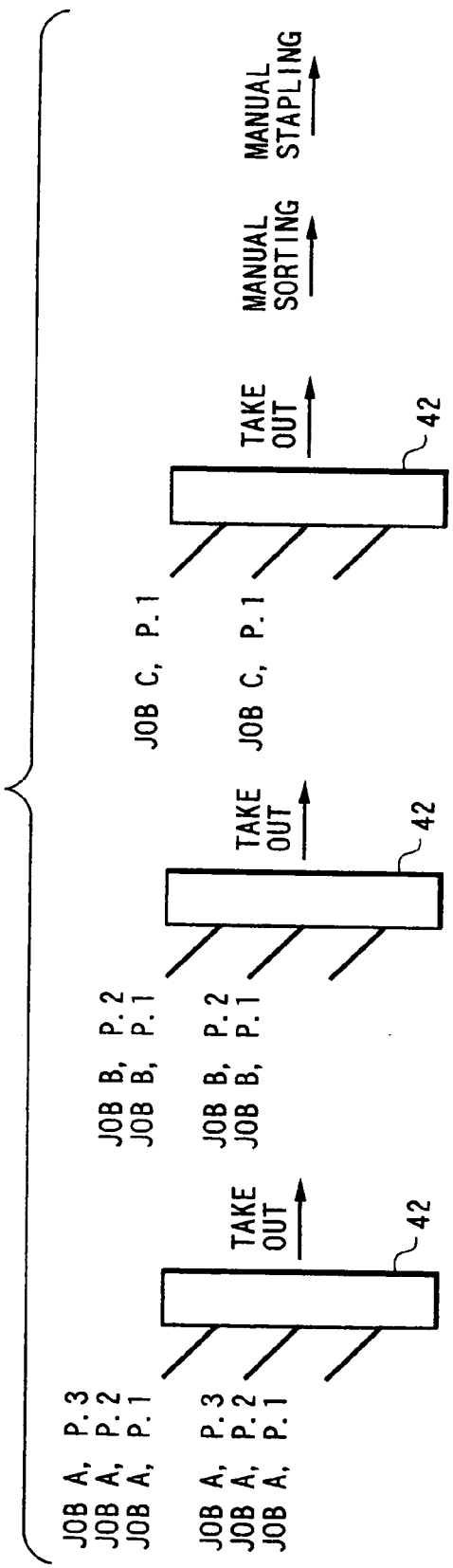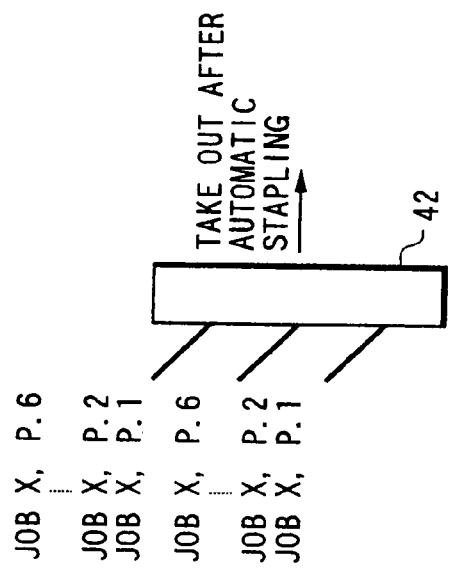

FIG. 11A
JDL
J: A+B+C

FIG. 11B
JDL
J: A1-2+C+A3

FIG. 11C
JDL
J: B/C

FIG. 11D
JDL
M: 4IN1
J: A+B+C

FIG. 11E
JDL
M: DUPLEX
J: A+B+C

FIG. 11F
JDL
M: SORT
J: A+B+C

FIG. 11G
JDL
M: SORT
M: STAPLE
J: A+B+C

FIG. 11H
JDL
M: COPY=4
J: A+B+C

FIG. 19A

```
ENTER NO. OF JOB YOU DESIRE TO JOINT WITH
TEN KEY AND PRESS OK

1→3→4→5→2

1: USER A      3: SCANNER S1    11: DF1
   JOB A                        12: DF2
                                13: DF3
2: USER B      4: USER D
   JOB B          JOB D     ( SET MODE ) ( OK ) ( EXIT )
```

FIG. 19B

```
SELECT MODE WITH UP/DOWN KEY, ENTER NUMERAL
WITH TEN KEY, AND SET ON/OFF WITH LEFT/RIGHT
KEY

COPY           1
NIN1           4
DUPLEX         ON
SORT           OFF
STAPLE         OFF
COMPOSITION    OFF                      ( OK )
```

FIG. 22A

```
ENTER NO. OF JOB YOU DESIRE TO JOINT WITH
TEN KEY AND PRESS OK

1→3

1: USER A    3: USER C    5: USER B
   JOB A       JOB C        JOB E

2: USER B    4: USER A    6:
   JOB B       JOB D
                              [ OK ]  [EXIT]
```

FIG. 22B

```
ENTER ID FOR JOB 3 WITH TEN KEY AND PRESS OK

1→3

1: USER A    3: USER C    5: USER B
   JOB A       JOB C        JOB E

2: USER B    4: USER A    6:
   JOB B       JOB D
                              [ OK ]  [EXIT]
```

FIG. 25
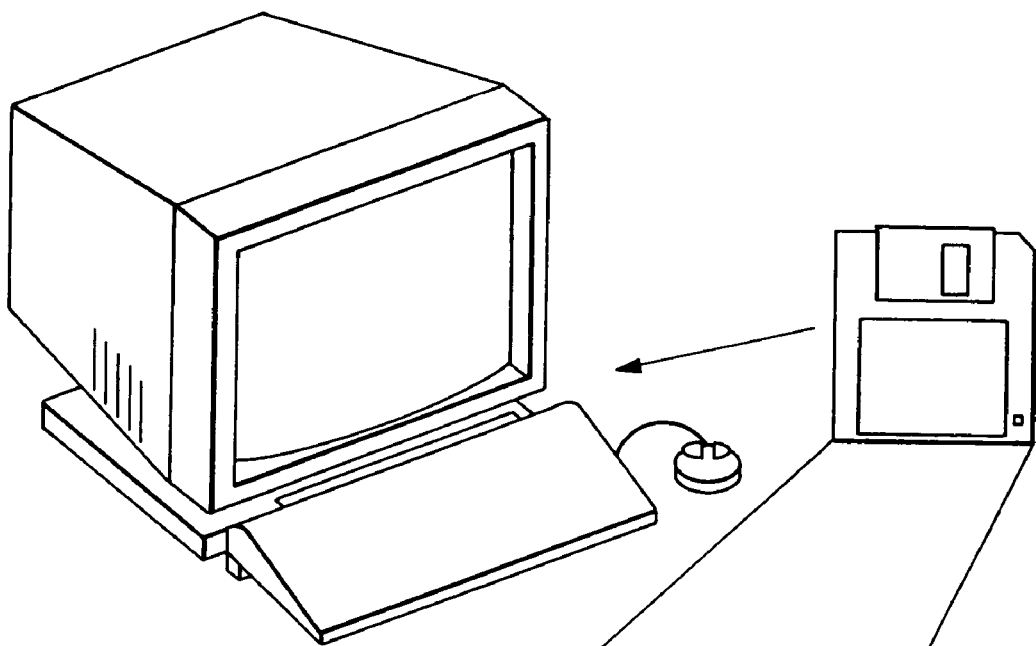
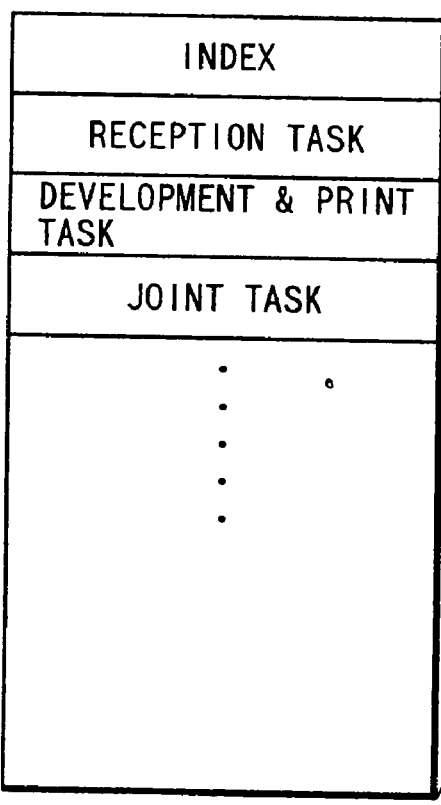

APPARATUS FOR CONTROLLING IMAGE PROCESSING AND A METHOD FOR CONTROLLING IMAGE PROCESSING

This application is a continuation of U.S. patent application Ser. No. 08/745,152, filed Nov. 7, 1996 now U.S. Pat. No. 6,813,038.

BACKGROUND OF THE INVENTION

1. Field of the Invention

The present invention relates to an apparatus for controlling image processing to control processing image data transferred from a host computer or the like. More particularly, the invention relates to an apparatus for controlling image processing that receives image data from a host computer or the like in the form of the PDL data described using the page description language (hereinafter referred to as the PDL), and relates also to a method for controlling processing images.

2. Related Background Art

Conventionally, the printing operation has been executed per printing job in a printing system in which PDL data are received from a host computer or the like, and images are processed and transferred for the image formation thereof. A unit set by a user in printing a document using an application program on a host computer is, in general, defined as a printing job. Each of such printing jobs transferred from the host computer has hitherto been processed for printing individually.

Since each printing job transferred from a host computer is processed for printing individually in the conventional image processing apparatus described above, there are encountered the problems given below.

1) When each printing job is executed for printing in a printer, the printer is actuated and suspended per printing job. Therefore, if a printer takes a long time to be actuated and suspended, a waiting time between jobs becomes longer, leading to an unfavorable performance.

2) For a printer connected to an image processing apparatus, which is capable of printing on the right and reverse sides of one printing sheet, it is impossible to form a page contained in different jobs on the right and reverse sides of one sheet.

3) For an image processing apparatus, which is provided with the N-in-1 printing function that enables the apparatus to print N-page images side by side on one sheet, it is impossible to form the pages contained in difference jobs on one sheet.

4) For a printer connected to an image processing apparatus, which is provided with the sort printing function to sort and print jobs on plural pages or plural sheets partly or per job, it is impossible to sort and print pages contained in different jobs together.

5) For a printer connected to an image processing apparatus, which is provided with the sort-staple printing function where stapling is made per sorted sheet after a sort printing, it is impossible to execute the sort-staple printing for pages included in different jobs together.

Also, when a user produces one document by dividing it into a plurality of files, there is a need for the user to sort each of them manually if he prints them each individually.

Further, when a user produces one documents using a plurality of applications, there is a need for the user to sort them manually when he prints them each individually. If he produces the first and third pages using an application for producing documents, and then, produces the second and fourth pages using another application for producing graphics, or the like, he should manually sort them after printing, for example.

Furthermore, when one document is divided and produced by a plurality of users responsible for the divided portions, respectively, it is necessary for the users to print each of them individually and sort them manually.

SUMMARY OF THE INVENTION

The present invention is designed in consideration of the situations described above. It is an object of the invention to provide an apparatus for controlling image processing capable of applying the various processes, which should be executed per unit of job in the conventional art, to a plurality of printing jobs as a whole by joining a plurality of printing jobs that have been transferred from a computer on the printer or server side, as well as to provide a method for controlling image processing.

In order to achieve the objectives described in the preceding paragraph, the apparatus for controlling image processing of the present invention and the method therefor are arranged to receive printing jobs; to hold the printing jobs thus received; to join a plurality of printing jobs in a spooler together as one printing job; to control a printer so that the printing jobs thus joined can be transferred to the printer side to form images; and to execute image processing for the joined printing jobs as one printing job having a plurality of printing jobs thus put together.

BRIEF DESCRIPTION OF THE DRAWINGS

FIG. 3 is a view which schematically shows the structure of an image forming apparatus.

FIGS. 4A, 4B, 4C, 4D, 4E and 4F are views which illustrate the PDL.

FIGS. 6A and 6B are views which illustrate a printing on the right and reverse sides of a sheet.

FIGS. 7A and 7B are views which illustrate a duplex printing.

FIGS. 8A and 8B are views which illustrate a 4-in-1 printing.

FIGS. 9A and 9B are views which illustrate a sort-printing.

FIGS. 11A, 11B, 11C, 11D, 11E, 11F, 11G and 11H are views which illustrate the JDL.

FIGS. 19A and 19B are views which illustrate an operational screen in accordance with the third embodiment.

FIGS. 22A and 22B are views which illustrate an operational screen in accordance with the fourth embodiment.

FIG. 25 is a view which schematically shows a case where a program is provided for an apparatus.

DETAILED DESCRIPTION OF THE PREFERRED EMBODIMENTS

First Embodiment

Figure 2:
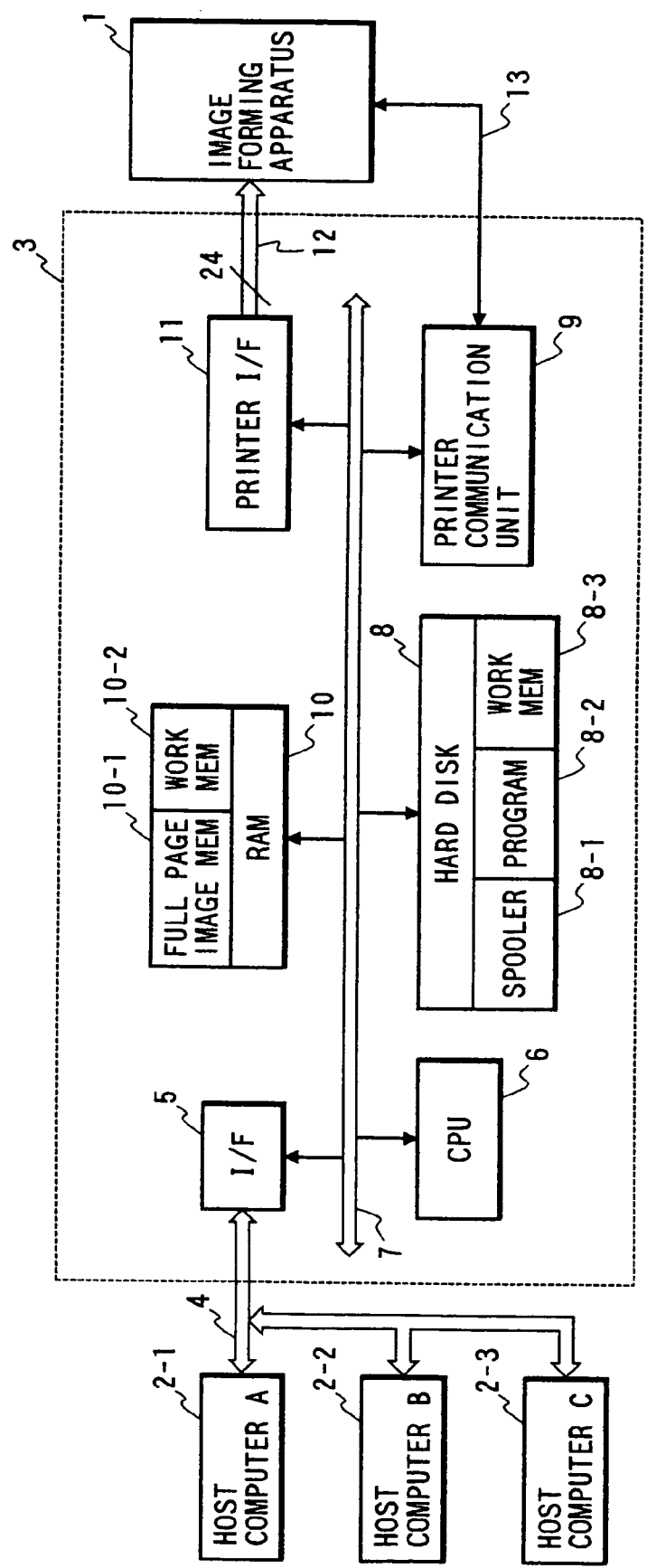
FIG. 2 is a block diagram which shows an image processing apparatus in accordance with a first embodiment of the present invention.

FIG. 2 is a block diagram which shows an image formation system comprising an image processing apparatus 3 and an image forming apparatus 1, which deal with the color PDL in accordance with a first embodiment of the present invention.

As shown in FIG. 2, host computers 2-1, 2-2, and 2-3 and an image processing apparatus 3 are connected through a network 4. The PDL data that have been transferred from the host computers through the network 4 and an external interface circuit 5 are held once on a spooler area 8-1 on a hard disk 8 by means of a CPU 6. Then, the PDL data read out from the spooler area 8-1 are developed into the raster image data, which are written on a full-page image memory 10-1 in a RAM 10. The image data thus developed are read out from the full-page image memory 10-1 and transferred to an image forming apparatus 1 by way of a printer interface circuit 11 for the formation of images. The program area 8-2 on the hard disk 8 is used for holding a program. This program is transferred to a work memory region 10-2 in the RAM 10 for the execution of the program. A part of the work memory region 10-2 and the work memory region 8-3 on the hard disk 8 are also used as provisional work regions. A printer communication unit 9 is used for communicating with the image forming apparatus 1. Also, a reference numeral 7 designates a CPU bus to connect them.

In accordance with the present embodiment, the image memory 10-1 comprises a total of 24 bits, 8 bits each of RGB (Red, Green, and Blue) per pixel, having a capacity of one page portion in terms of an A-3 size. When printing in an A-4 size, it can hold a two-page portion.

In accordance with the present embodiment, the image forming apparatus 1 is a full-color electro-photographic copying machine, and performs the image formation in accordance with the raster type image data 12 of 24 bits, 8 bits each of RGB per pixel, which are transferred from an image processing apparatus. Since, however, the image formation is made by use of four color toners of YMCK (Yellow, Magenta, Cyan, and Black), the RGB should be converted to the YMCK in the interior of the image forming apparatus 1.

FIG. 3 is a block diagram which schematically illustrates the structure of the full-color electro-photographic copying machine serving as the image forming apparatus 1. A reference 31 designates an automatic document feeder, which is called DF (Document Feeder). An automatic DF is used for many copying machines currently available on the market. Therefore, any detailed description thereof will be omitted. This device is such that a plurality of documents are stacked on it, and each one of them is being carried to a reading position thereof. A document placed on the reading position thereof (not shown) is read by a image reader 32 comprising an optical system, color CCD, and the like (not shown) and transformed into an RGB image data. Then, through a switching 45, such data are converted to YMCK by means of an image processor 33. After that, the data are transferred to a laser driver 34. Meanwhile, the image data 12, which are transferred from the image processing apparatus 3, are also converted to YMCK data by the image processor 33 through the switching 45, and after that, transferred to the laser driver 34. When the image forming apparatus 1 functions as a copying machine, the image data 46 are selected by the switching unit 45 among those from the image reader 32. When functioning as a printer, the image data 12 are selected by the switching 45 among those being transferred from the image processing apparatus 3. The image data transferred from the image processor 33 are transformed into laser beam in the laser driver 34 in order to form latent images on a photosensitive drum 35. A sheet to form images on is being fed from an upper cassette 37 or a lower cassette 39 and wound around a transfer drum 36. Toner adheres to the latent images on the photosensitive drum by means of a developing device (not shown) to become visible ones, which are transferred onto the sheet by means of the transfer unit 36. The formation of latent images, development, and transfer are repeated four times by rotating the transfer drum four times per YMCK per sheet so as to transfer YMCK toners onto the sheet. The sheet having the transferred toners is carried to a fixing device 40 where toners are fused and fixed to form full-color images. The sheet thus fixed is carried to a staple sorter 42 at the time of ordinary printing (the same is applicable to an ordinary copying. Hereinafter, the same), and usually, delivered to the uppermost tray 44-1.

On the other hand, when a printing is made on the right surface of a double printing, a sheet that has passed the fixing device 40 is carried to a reversing unit 41. Then, its forwarding direction is reversed by the reversing unit 41 to enter a duplex tray 38. At this juncture, the images on the right side are placed on the upper side of a sheet. Then, printing is made on the reverse side of the sheet fed from the duplex tray in the same path as in the ordinary printing, and delivered.

Further, when an ordinary sort printing is made on a plurality of pages on plural sheets, each sheet transferred to a staple sorter 42 is output by distributing them to each of the delivery sheet trays 44-1, 44-2, and 44-3. In other words, the output of one sheet having plural pages is stacked on each of the sheet delivery trays.

Also, when a group sort printing is made on a plurality of pages on plural sheets, each of the pages transferred to the staple sorter 42 is output by distributing it to each of the sheet delivery trays 44-1, 44-2, and 44-3. In other words, the output of plural sheets is stacked on each of the sheet delivery trays per page.

Here, the ordinary sort printing and group sort printing are referred to as a sort printing altogether. Also, since FIG. 3 is a schematic view, only three sheet delivery trays are represented. In practice, however, an arrangement is made to form this structure by use of 10 or 25 trays.

Also, to the staple sorter 42, a stapler 43 belongs, which has a function to staple sheets stacked on each of the sheet delivery trays. Usually, this function is applied together with the sort printing function. Therefore, it is called the sort-staple printing. For example, when this function is combined with a sort-printing, a stapling is usually executed per output of one sheet of plural pages, and then, plural sheets thereof are obtained.

FIGS. 4A, 4B, 4C, 4D, 4E and 4F are views which illustrate the PDL data. The PDL (Page Description Language) represented by a language, Post Script (registered trade mark) of the ADOBE Inc. is, as shown in FIG. 4A, the language to describe images per image on one page by combining elements of (i) images described through character codes, (ii) images described through graphic codes, (iii) images described through raster image data, among some others.

FIG. 4B shows the example of a description through character codes. A reference mark L100 designates a description to specify the character colors. The description in parentheses represents brightness of red, green, and blue in that order. The minimum is 0.0 and the maximum is 1.0. The L100 designates that the characters are colored in black. Then, a reference mark L101 designates that a character string "IC" is assigned to a variable String1. Then, a reference mark L102 designates that the first and second parameters indicate the x coordinate and y coordinate at the starting position thereof on a sheet on which the layout of a character string is designed, and that the third parameter indicates the size of characters, the fourth parameter indicates intervals between the characters, while the fifth parameter indicates the character string that should be designed for the intended layout. In other words, the L102 designates a character string "IC" beginning at coordinates (0, 0, 0, 0) in a size of 0.3 at an interval of 0.1 for the intended layout.

FIG. 4C shows the example of a description through graphic codes. A reference mark L103 designates the line colors as in the L100. Here, the red color is specified. Then, a reference mark L104 designates an instruction to draw lines whose first and second parameters designate the starting X and Y coordinates and the third and fourth parameters designate the terminating X and Y coordinates thereof, and fifth parameter designates the thickness of the line.

FIG. 4D shows the example of a description through raster image data. A reference mark L105 designates that the raster image data are assigned to a variable image1. Here, the first parameter indicates the image type of the raster image and the numbers of color components. The second parameter indicates the bit numbers of one color component. The third and fourth parameters indicate the image size of raster image in the direction x and direction y. The fifth parameter and on indicate the raster image data. The numbers of raster image data are the product of the numbers of color components that form one pixel, and the image size in the direction x and direction y. For the L105, the RGB image is formed by three color components (Red, Green, and Blue). Therefore, the numbers of raster image data are 75 (=3×5×5).

FIG. 4E shows a state where the raster image data are developed by interpreting the, image descriptions represented in FIGS. 4B, 4C, and 4D within one page. Reference marks R100, R101, and R102 designate the developments of the PDL data shown in FIGS. 4B, 4C, and 4D, respectively. Actually, these raster image data are developed within the full-page image memory 10-1 per RGB color component. For example, for the R100 portion, 0 is written for each of them in each of the RGB memories, while for the R101 portion, 255, 0, 0 are written, respectively.

The PDL data transferred from the host computer 2 are developed to the raster image likewise, and written on the image memory 10-1.

In accordance with the present embodiment, it is ready for the PDL to make the descriptions of various modes when executing a printing job. FIG. 4F shows the example of such descriptions of various modes. A reference mark L107 designates an instruction to print this job in the 4-in-1 mode that will be described later; likewise, L108, L109, and L110, instructions to print this job in the duplex mode, sort mode, and staple mode, respectively. These modes will be described later. Also, a reference mark L111 designates an instruction to print four sheets per page included in this job. The 4-in-1 mode will be described later.

Figure 5:
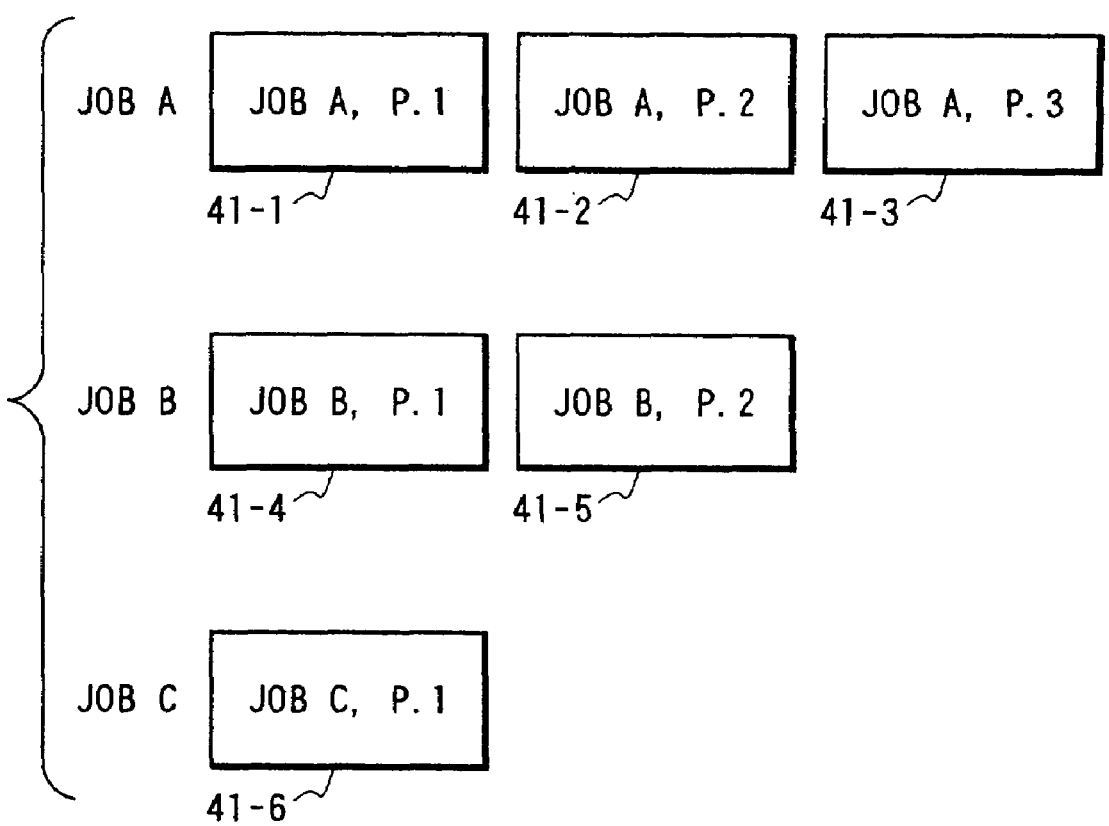
FIG. 5 is a view which illustrates printing jobs.

FIG. 5 is a view which illustrates printing jobs. The job A is a printing job transferred from the user a (host computer a). This job is formed by three pages 41-1 to 41-3. In FIG. 5, a reference mark P.1 designates a first page. Likewise, the job B is a two-page job from the user 2. The job C is a one-page job from the user a.

Figure 1:
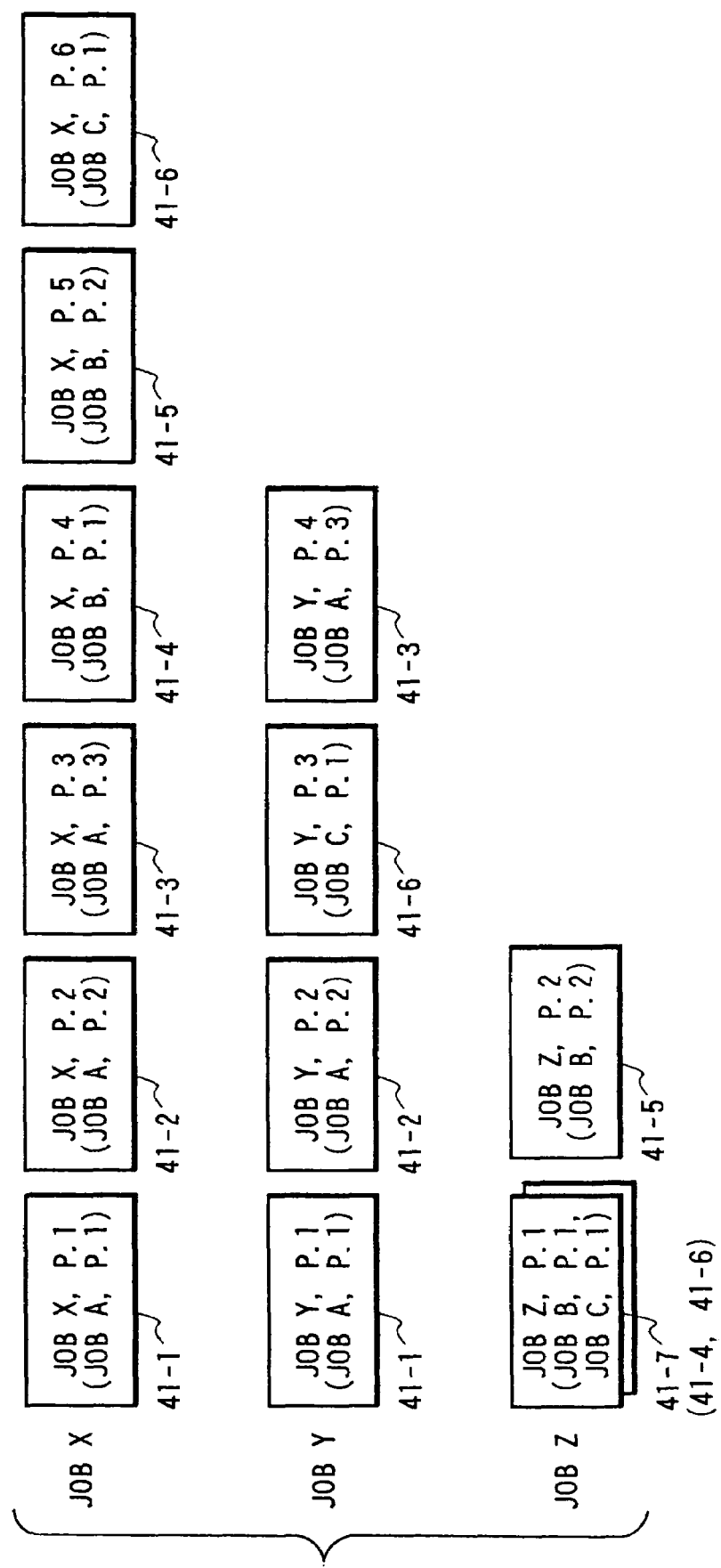
FIG. 1 is a view which illustrates a job joint.

FIG. 1 is a view which illustrates a job joint. The "addition-joint" job X is a job to joint the job A, job B, and job C in FIG. 5 additionally in that order. In other words, the three pages of the job A are the first page to third page of the joint job X; likewise, the job B, the fourth and fifth pages; and the job C, the sixth page. The "insertion-joint" job Y is a job to insert the job C in FIG. 5 between the second and third pages of the job A and join them together. The joint job Y is formed by inserting another job into one job, but the present invention is not necessarily limited thereto. A case where each of the pages of two or more jobs is joined at random like a nest is also included. The "composition-joint" job Z is a joint job where the job B and job C in FIG. 5 are composed. In other words, the first page of the job B and the first page of the job C are overlaid for formation on one sheet.

FIGS. 6A and 6B are views which illustrate a continuous printing. FIG. 6A represents a state where printing is continuously executed without any job joint. At first, a printer is actuated to print the job A. When the printer is ready, the feeding of the first page begins. Then, an image formation is executed, and the sheet is delivered. Each of the pages for one job is given a pipe line process (an assembly-line process), thus executing the sheet feeding, formation, and sheet delivery in succession. In other words, in parallel with the sheet delivery of the first page, the formation of the second page, and the sheet feeding of the third page are performed. When the third page, that is, the last page of the job A, is delivered, the printer enters its suspension process. After such process is completed, the printer comes to a stop. The job B printing takes place after the printer is actuated anew after the complete termination of the job A printing.

On the other hand, FIG. 6B represents the state where a printing is continuously executed by the application of the "addition-joint" job X when jobs are joined. The first three pages (job A) of the job X are printed in the same manner as shown in FIG. 6A, but in the job joint, the next two pages (job B) and one page (job C) to follow are also formed in succession without any suspension of the printer between jobs A and B, and between jobs B and C. Therefore, as clear from FIGS. 6A and 6B, the time required for printing for the jobs A, B, and C becomes much shorter when the job joint is executed.

FIGS. 7A and 7B are views which illustrate a duplex printing. FIG. 7A represents a state where a duplex printing is executed without any job joint. At first, the first and second pages of the job A are formed on the right and reverse sides of one sheet. Then, the third page of the job A is printed on the right side of the second sheet. However, since there is only the third page for the job A, the second sheet is delivered without any prints on the reverse side thereof. Likewise, the job C is executed to print on both sides using one sheet each, respectively.

On the other hand, FIG. 7B represents a state where a duplex printing is executed by the application of the addition-joint job X when a job joint is performed. As in the case shown in FIG. 7A, the first two pages of the job X are formed on the right and reverse sides of the first sheet. Then, the third page of the job A, which is the third page of the job X and the first page of the job B, which is the fourth page of the job X, are formed on the right and reverse sides of the second sheet. At the same time, the second page of the job B and the first page of the job C are formed on the right and reverse sides of the third sheet. In this way, whereas four sheets are needed for printing shown in FIG. 7A, only three sheets are needed for the execution of printing shown in FIG. 7B. Also, if the jobs A, B, and C are prepared for the production of one document from the beginning, it is not desirable to allow blank portions to enter between them as shown in FIG. 7A.

FIGS. 8A and 8B are views which illustrate a 4-in-1 printing. FIG. 8A represents a state of a 4-in-1 printing without any execution of job joint. The 4-in-1 printing means a function to print images of four sheets on one sheet side by side by means of image contraction and such arrangement of contracted images thereon. The number of images for the side by side arrangement is not necessarily four, but two or eight may be printable likewise. These are collectively called an N-in-1 printing function. For the 4-in-1 printing, the first to third pages of the job A are formed on the first sheet side by side. Since there are only three pages for the job A, the fourth area of the first sheet is formed in blank without any images. Likewise, the 4-in-1 printing is executed for the job B and job C using one sheet, respectively.

On the other hand, FIG. 8B represents a state where the 4-in-1 printing is executed by the application of the addition-joint job X when a job joint is performed. The first three pages (job A) of the job X are placed on the first sheet side by side. Then, the first page of the job B, which is the fourth page of the job X is placed side by side on the fourth area on the first sheet. Likewise, the second page of the job B and the first page of the job C are formed on the second sheet side by side. In this way, whereas three sheets are needed for the performance shown in FIG. 8A, only two sheets are needed for the performance shown in FIG. 8B. Also, if the jobs A, B, and C are prepared for the formation of one document from the beginning, it is not desirable to allow black portions to enter between them as shown in FIG. 8A.

FIGS. 9A and 9B are views which illustrate a sort printing. FIG. 9A represents a state of a sort printing without the execution of any job joint. At first, two sheets of three pages of the job A are sort-printed, and each of the sheets of the job A is delivered to each of the sheet delivery trays on the staple sorter 42 one by one. The user picks them up, and then, two sheets of two pages of the job B and two sheets of one page of the job C are delivered in the same manner. Therefore, the user should manually sort each of the jobs, each page of which has been delivered one by one if the jobs A, B, and C are prepared for one document from the beginning. This arrangement requires a considerable amount of work particularly when there is a need for the user to sort each page of each job in the form of nest. Also, if stapling is needed per sorted portion, it is necessary for the user to sort each of the pages manually, and then, to staple them manually.

On the other hand, FIG. 9B represents a state of a sort printing of an addition-joint job X when the job joint is performed. As in FIG. 9A, the first two sheets of three pages of the job X are sort-printed. Each one of them is delivered to each of the sheet delivery trays on the staple sorter one by one. Then, two sheets of the job B, which are the fourth and fifth pages of the job X, are sort-printed, and delivered onto the pages of the job A. Likewise, two pages of the job C are delivered onto those of the job B. As a result, six pages of the job X are delivered onto each of the sheet delivery trays one by one. This has been a description regarding a case of the addition-joint job X. However, also, in a case of an insertion-joint job Y, sheets are delivered likewise onto each of the sheet delivery trays in order of being joined as in the addition-joint job. Therefore, it is unnecessary for the user to sort them manually. Likewise, when stapling is required for each sorted portion, the stapler 43 staples each portion automatically.

Here, the description has been made of a case where an ordinary sorting is performed, but the same is applicable to a case where sorting is performed by the application of a group sort instead of the ordinary sort.

As described above, each of the continuous printing, duplex printing, N-in-1 printing, sort printing, staple-sort printing has been explained individually with respect to the job joint. It is of course possible to combine each of these functions and apply them to a job joint. For example, a job joint is possible in such a manner that while executing the 4-in-1, the duplex printing is performed with the subsequent staple sorting.

Figure 10:
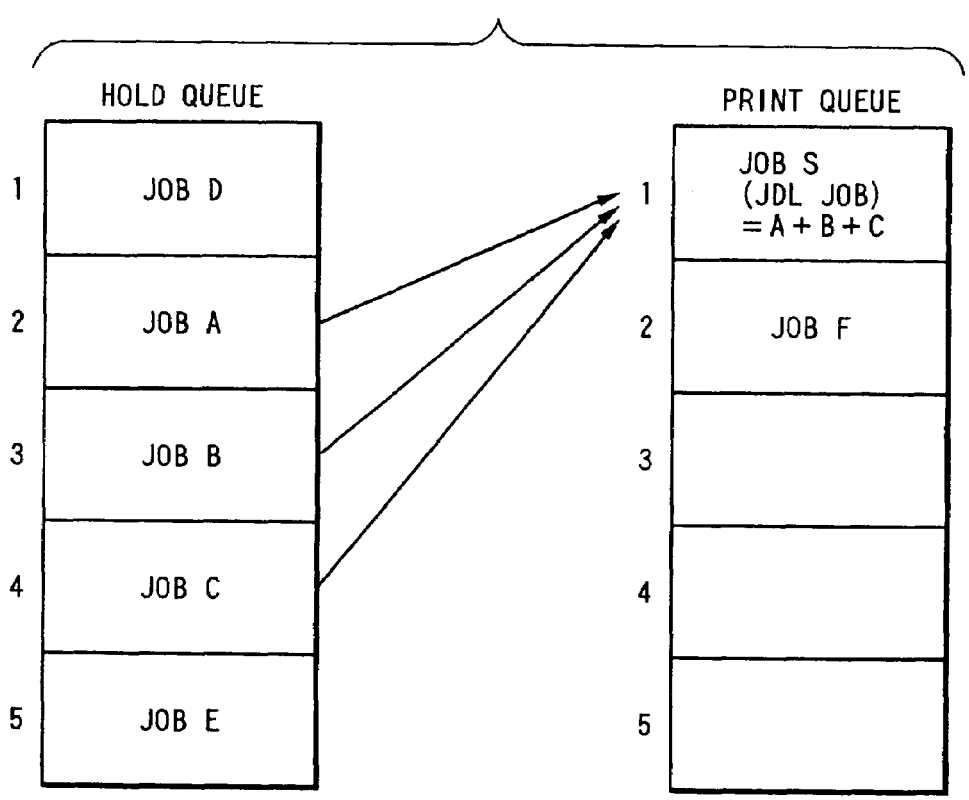
FIG. 10 is a view which shows the structure of a queue in accordance with the first embodiment.

FIG. 10 is a view which illustrates the state of a job joint being executed. The image processing apparatus of the first embodiment holds jobs received from a host computer in the spooler 8-1 on a hard disk. Two kinds of queues are used to hold them. As shown in FIG. 10, one is called a printing queue where jobs are arranged in line in order of those being received in the queue. It is devised to execute printing beginning with a job at the head of the queue. The other is called a holding queue where, although jobs are arranged in line in order of those being received, the jobs in the holding queue are not executed unless the user intentionally transfers them to the printing queue.

In accordance with the present embodiment, when printing jobs are transferred from a host computer to the image processing apparatus 3, it is arranged for the apparatus to designate the kinds of the queues to receive them. For the job joint of the present embodiment, the jobs are received in the holding queue in advance for a job joint. In FIG. 10, jobs A, B, and C in the holding queue are those to be joined. A job joint is instructed using a job description by the JDL (Job Description Language), which will be described later. The JDL is an expansion of the PDL, and the JDL job is handled as a kind of PDL job. To execute a job joint, a JDL job, which includes an instruction of the job joint is provided by a host computer for the printing queue for its printing. As shown in FIG. 10, when a job arrives at the head of the printing queue, it begins to execute processing a job joint as instructed by the job description written in the JDL. Here, the JDL job S shown in FIG. 10 is the one that instructs the addition-joint of the jobs A, B, and C.

FIGS. 11A, 11B, 11C, 11D, 11E, 11F, 11G and 11H are views which illustrate the example of a JDL job. At first, the first line in FIG. 11A reading "##JDL" indicates that the current job is not any of the general PDL jobs, but a JDL job.

The second line in FIG. 11A reading "#J:A+B+C" is an instruction that the jobs A, B, and C should be joined in that order. Incidentally, in accordance with the present embodiment, a line having the mark "#" at the head thereof is handled as a comment line for the PDL. Therefore, the current job is not regarded as any of the PDL jobs.

Now, the second line in FIG. 11B is an instruction that the first page and the second page of the job A, the job C, and the third page of the job A should be joined in that order. Then, the second line in FIG. 11C is an instruction that the job B and job C should be joined for composition. The second line in FIG. 11D is an instruction that the whole jobs instructed by the third line for a job joint should be printed in the mode of 4-in-1 printing. Likewise, FIGS. 11E, 11F, and 11G include the instructions that each of the job joints should be printed in the modes of duplex printing, sort printing, staple-sort printing, respectively. Lastly, the second line in FIG. 11H is an instruction that the job joints should be printed in four copies. Here, each of the modes is described in FIGS. 11A to 11H individually, but it may be possible to designate each of the modes in combination by arranging those lines of the mode designations side by side as required. However, if one mode is not consistent with another in combination, such as 2-in-1 and 4-in-1, the one designated later becomes effective.

Figure 12:
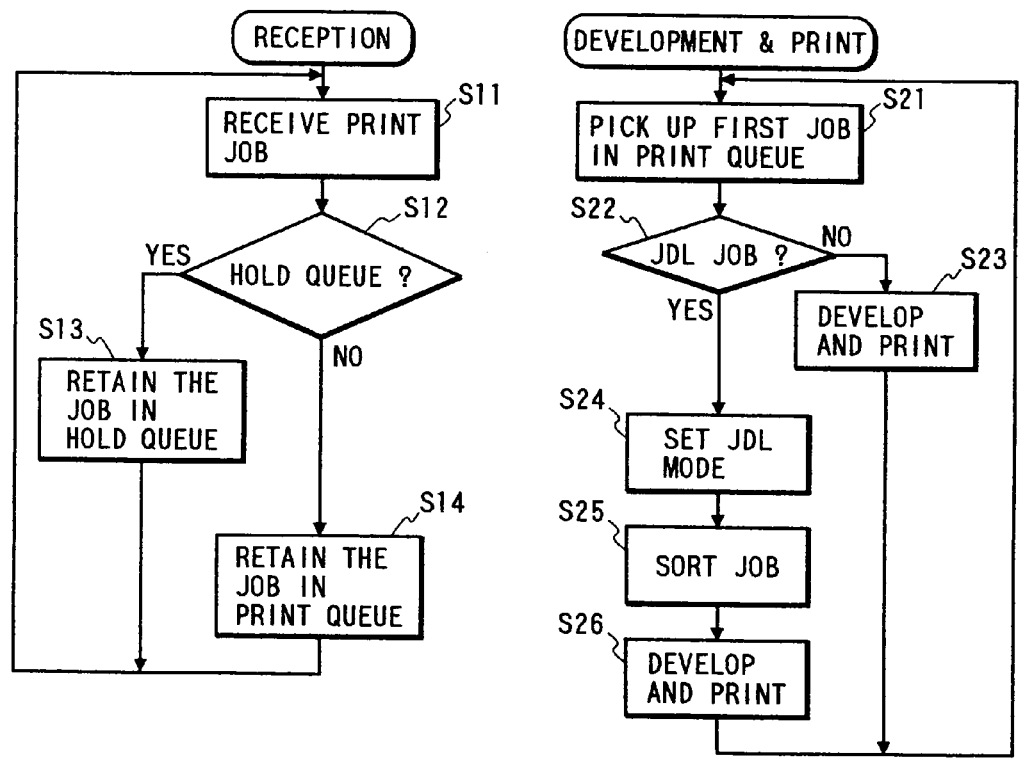
FIG. 12 is a flowchart (1) used for the image processing apparatus in accordance with the first embodiment.

FIG. 12 a flowchart which illustrates the control flow of the image processing apparatus 3 in accordance with the first embodiment. At first, in S11, the reception task is executed to receive printing jobs at a request from any one of host computers on the network. Then, in S12, it is determined whether or not such printing jobs are transferred together with any designation to retain them in the holding queue. If affirmative, the jobs are held in the holding queue in S13. On the other hand, if the printing queue is designated or no particular designation is provided for any queues, the jobs are held in the printing queue in S14.

Meanwhile, in S21 in FIG. 12, the development and printing tasks are, at first, executed to pick up a job at the head of the printing queue. Then, in S22, it is determined whether or not the job thus picked up is a JDL job in accordance with the first line that indicates "##JDL". If negative, the development is executed and printing is processed as a usual PDL job in S23. Regarding the development and printing processes, the description will be made later in conjunction with FIG. 13. On the other hand, if the job thus picked up is the one described by the JDL, each of the modes designated by the lines beginning with "#M:" is defined as JDL modes in S24. Then, in S25, each page in each job is sorted in S25 in accordance with the order designated by the line beginning with "#J:" as described in conjunction with FIG. 11, for example. At this juncture, each of the jobs is transferred from the holding queue and joined together. When the job sorting is completed, the development and printing processes are executed in S26 as in the S23.

Figure 13:
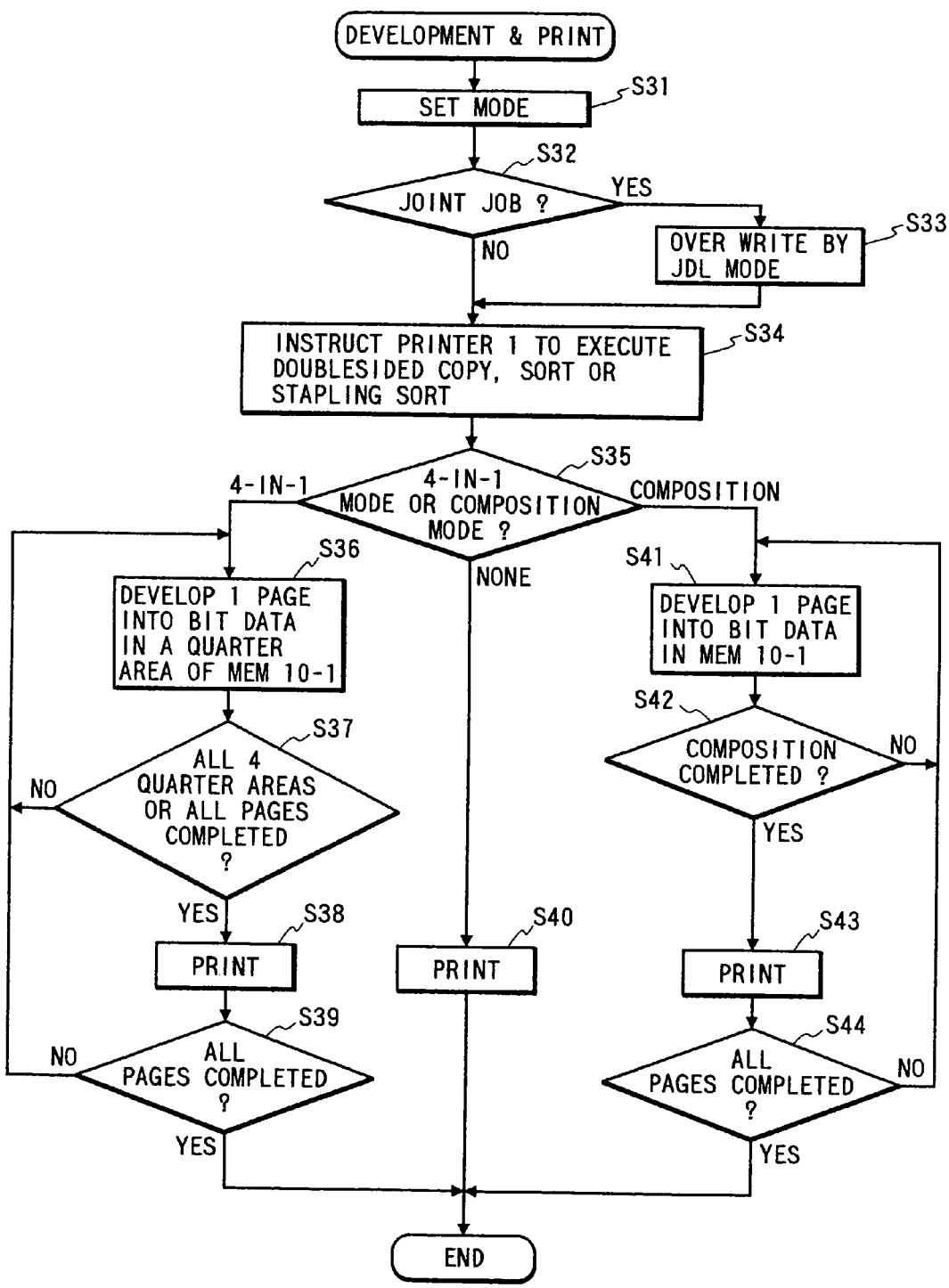
FIG. 13 is a flowchart (2) for the image processing apparatus in accordance with the first embodiment.

FIG. 13 is a flowchart which shows the development and printing processes in detail. At first, in S31, each of the modes designated for the PDL job is defined for each of the job processing modes thereof. Then, in S32, it is determined whether or not the current job is a job joint instructed by the job description written in the JDL. If affirmative, the modes defined in the S31 are substituted in S33 by the JDL modes defined in the S24 shown in FIG. 12. This is because, in a job joint, each of the modes designated in the JDL job is given priority to any one of the modes designated in each of the job joints when being processed. As a result, if a 4-in-1 is designated in the JDL job, for example, this designation is given priority and all the pages are printed in this mode of 4-in-1 even if a 2-in-1 is instructed for a job A; a 4-in-1, for a job B; and an ordinary printing, for a job C.

Then, in S34, in accordance with each of the modes designated, a printer 1 is notified of whether the mode is duplex, sort, or staple-sort. Subsequently, in S35, it is determined whether or not any 4-in-1 mode or composition-mode is designated. If neither of them are designated, each of the pages is developed in S40 on the full-page image memory one after another. The image data thus developed are transferred to the printer 1 for printing. At this juncture, if the task is a job joint, each of the pages of the job joint is transferred one after another in order of those being put together. After all the pages are printed, the development and print processes terminate. In the S35, however, if the job is in a 4-in-1 mode, the first page is developed in the first quarter area on the full-page image memory in S36, and in S37, it is determined whether or not all the four pages are completed, that is, it is determined whether the four areas on the full-page image memory are all filled or there are still any areas yet to be filled. If there are some pages still remaining or all the four areas are not completely filled, the process returns to the S36, and the next page is developed on the next quarter area on the full-page memory. Then, the process proceeds to the S37 again. On the other hand, if there is no page left to be filled or all the four areas are completely filled, the image data on the full-page image memory are transferred to the printer 1 for printing. In this way, the 4-in-1 printing is executable as described in conjunction with FIG. 8B. When the printing is over, it is determined whether or not there are still any other pages to be printed in S39. If affirmative, the process returns to the S36, and the next page is developed on the first quarter area on the full-page image memory. Then the process proceeds to S37. In the S39, if no page remains at all, the development and printing processes terminate.

Meanwhile, if the mode is composition in the S35, the first page is developed on the full-page image memory in S41. Then, in S42, it is determined whether or not any pages still remain to be composed with the preceding page. If affirmative, the process returns to the S41, the next page is developed on the full-page image memory. The process proceeds to the S42 again. For the second development and on in the S41, the full-page image memory is not erased before such development process nor any white data are written on the memory at the time of development. In this way, all the portions of data on plural pages with the exception of white data are substituted one after another, thus making it possible to execute a composed printing as described in conjunction with the composition-job joint illustrated in FIG. 1. In the S42, if there are no other pages to be composed, the image data on the full-page image memory are transferred to the printer 1 for printing. When printing is completed, it is determined whether or not any pages still remaining in S44. If affirmative, the process returns to the S41 where the full-page image memory is erased, and then, the next page is developed on the full-page image memory. The process proceeds to the S42 again. If there are no other pages remaining in the S44, the development and printing processes terminate.

Second Embodiment—Reducing Sheet Consumption

In accordance with the first embodiment, a job joint is designated using the JDL job. For a second embodiment, however, a structure is arranged to automatically designate a job joint if jobs satisfy a certain condition. Here, the description of the same portions as those of the first embodiment will be omitted. In conjunction with FIG. 14, FIG. 15, and FIG. 16, the description will be made of the portions that differ from the first embodiment.

The second embodiment thus structured is aimed at reducing the consumption of sheets. Even when there is no immediate need for any printed-out sheets, it may sometimes desirable to have the sources of print out readily available at hand. Each job of the kind is put together for printing in the mode of 4-in-1 or the like in order to reduce the sheet consumption.

Figure 14:
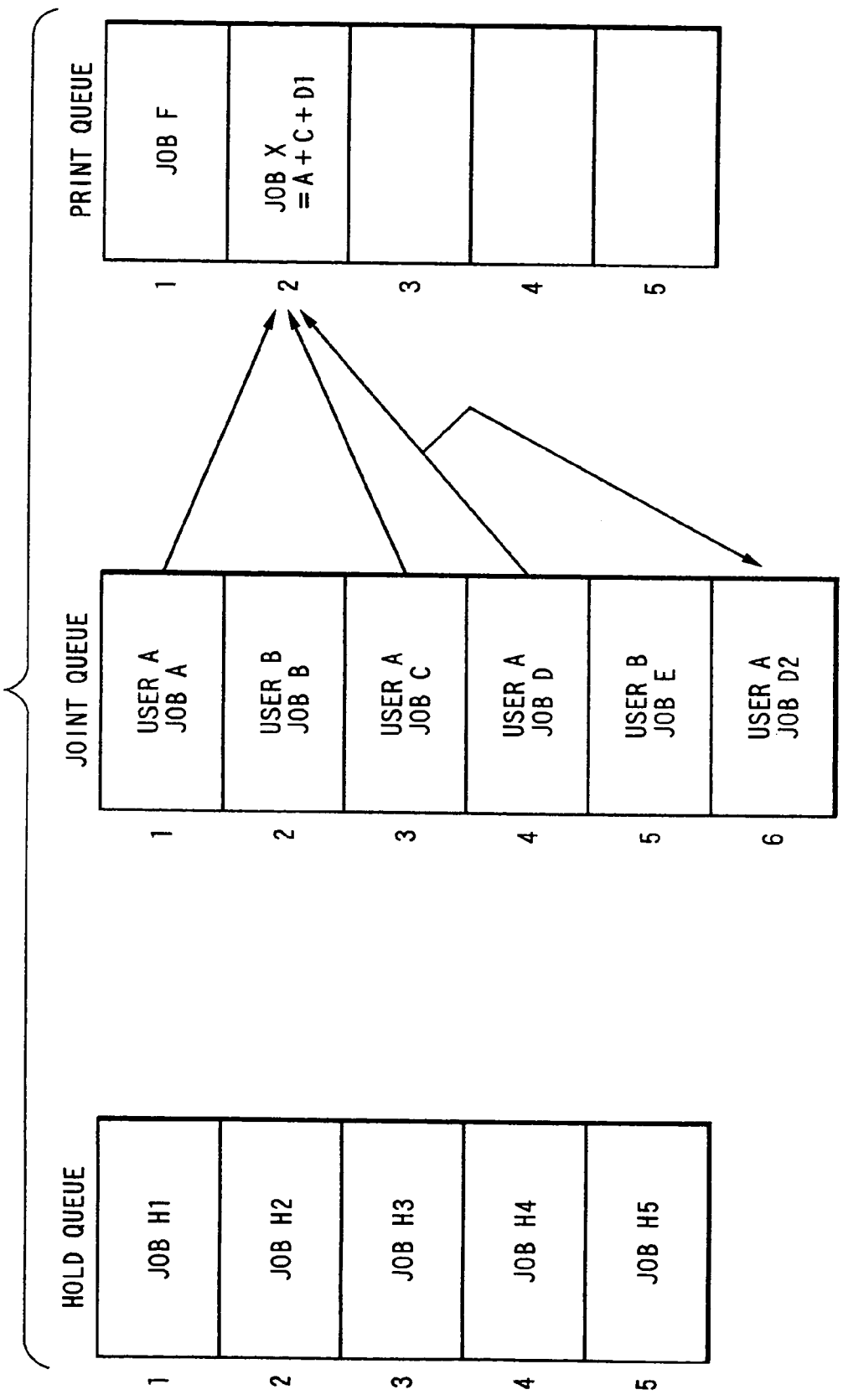
FIG. 14 is a view which shows the structure of a queue in accordance with a second embodiment of the present invention.

FIG. 14 is a view which illustrates queues arranged in the spooler in accordance with the second embodiment. As in the first embodiment, there are a holding queue and a printing queue. In addition, the one called a joint queue is arranged anew. For the image processing apparatus of the present embodiment, it is devised to designate which one of the three queues is the destination for a printing job to be transferred from a host computer. The job that enters the printing queue is automatically printed when it arrives at the head of the queue. On the other hand, the job that enters the holding queue is not printed unless it is transferred to the printing queue. Meanwhile, the job that enters the joint queue is automatically printed individually or jointly with some other jobs when it satisfies a certain condition. In accordance with the present embodiment, jobs to be joined should be retained in the joint queue. FIG. 14 illustrates a state where the jobs A, C and D, which are retained in the joint queue, are automatically joined to produce a job joint X when a certain condition is satisfied, and then, transferred to the printing queue. Here, for the reasons to be described later, the job D is divided into jobs D1 and D2. While the job D1 is joined with the jobs A and C to become the job X, the job D2 is returned to the last of the joint queue. The job joint X is automatically printed when it arrives at the head of the printing queue.

Figure 15:
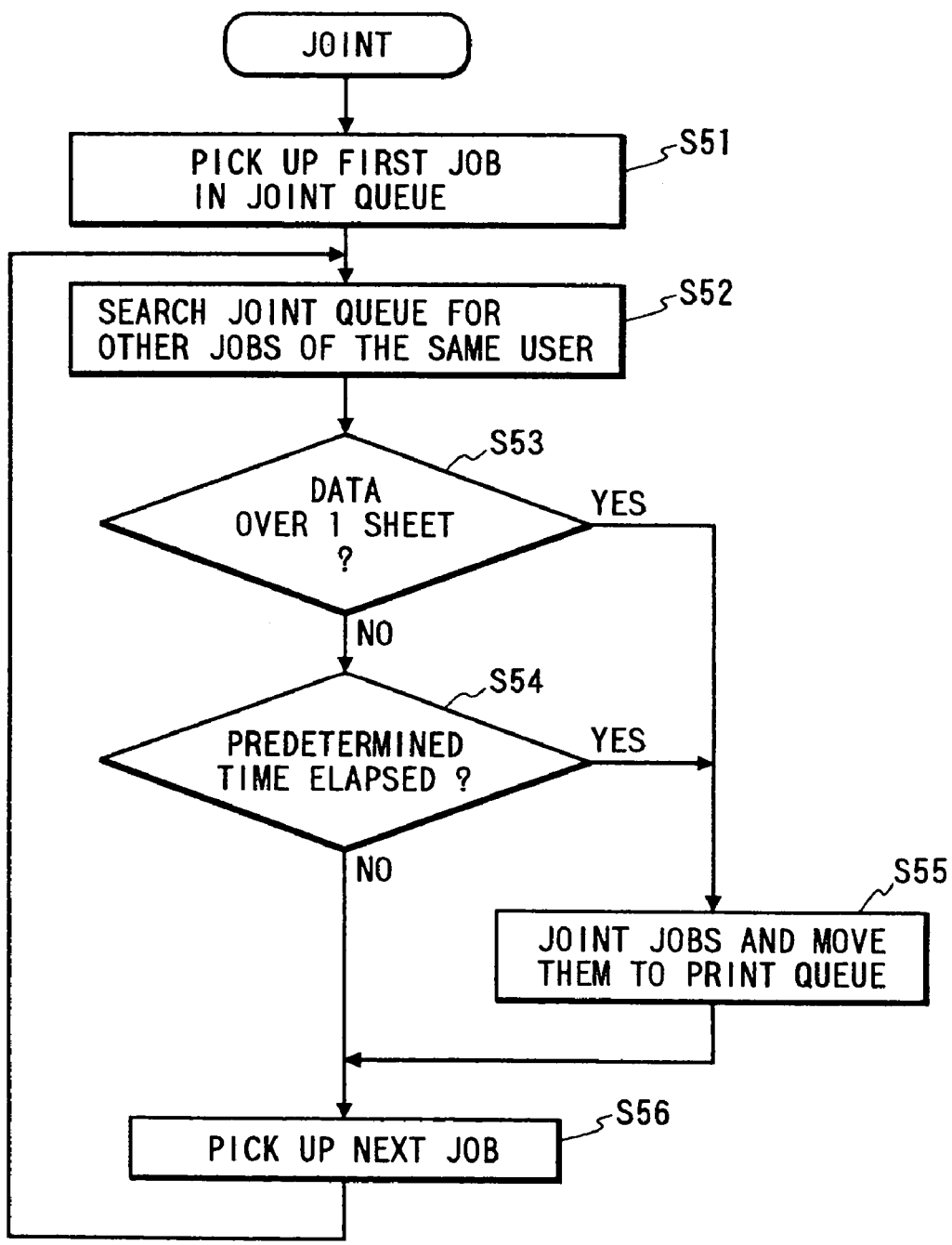
FIG. 15 is a flowchart for an image processing apparatus in accordance with the second embodiment.

FIG. 15 is a flowchart which illustrates the control flow of the image processing apparatus 3 in accordance with the second embodiment. With the joint task that is characteristics of the present embodiment, a job at the head of the joint queue is picked up in S51. In FIG. 14, the job A of the user a is picked up. Then, in S52, the other jobs of the user whose job has been picked up in the S51 are retrieved from among those retained in the joint queue. In FIG. 14, the job C and job D are retrieved. Subsequently, if each of the jobs is joined, it is determined whether or not the number of pages is more than the one-sheet portion of an output sheet. The number of pages per one output sheet means 2 if the mode is duplex or 4 if the mode is 4-in-1. In other words, with the pages that are less than those numbers, one output sheet is not fully filled. If the number of pages is more than the portion of one output sheet, each of the jobs is joined in S55 and transferred to the printing queue for the formation of images. At this juncture, the jobs that are joined and transferred to the printing queue are deleted from the joint queue. Also, the number of pages after the job joint is not a multiple of the number of pages on the portion of one output sheet, the pages in odd number are not joined, and returned to the joint queue as a remaining job. For example, in accordance with the example shown in FIG. 14, if the job A has two pages, the job C has one page, and the job D has two pages on the assumption that the job joint is printed in the mode of 4-in-1, the job A, job C, and the first page of the job D are joined to be a job X, while the second page of the job D is returned to the last of the joint queue. This is a process not to print on a sheet unless the sheet can be filled fully with images if the circumstances admit of it.

On the other hands, if the number of pages is not more than the portion of one output sheet in the S53, it is determined whether or not the intended job is such as the one among the respective jobs picked up by the user in the S54, which is still retained after a given time has elapsed since its entrance in the joint queue. If such jobs still remain in the queue, all the jobs are joined in S55 and transferred to the printing queue for the formation of images. At this juncture, the jobs that are put together and transferred to the printing queue are deleted from the joint queue. This is a process not to allow jobs to reside in the joint queue without being joined for a long time. Also, in the S54, instead of detecting the elapsed time, it may be possible to determine the length of stay in accordance with the date of entrance by detecting whether or not such job enters the queue before yesterday's date or the like, for example. Also, if the holding capacity of a hard disk becomes less than a given amount, it may be possible to print the jobs still remaining in the queue beginning with the oldest one, and to delete them one after another.

Meanwhile, in the S54, if there are no jobs that left intact after a given time has elapsed or in the S55, the transfer to the printing queue is completed, the next job is picked up in S56, and then, the process returns to the S52. In FIG. 14, the job B of the user b is picked up.

Figure 16:
FIG. 16 is a view which shows a printing format in accordance with the second embodiment.

FIG. 16 is a view which illustrates the printing format of a job joint in accordance with the present embodiment. Here, since the jobs in the joint queue are automatically joined, there is no need for mode designations using any job descriptions by the JDL as in the case of the first embodiment. As a result, it is possible to fix the format of a job joint. In accordance with the present embodiment, it is fixed to the single-sided one page 4-in-1 mode without sorting and stapling as shown in FIG. 16. Even if each kind of modes is designated for each of the jobs that should be joined, such designation is disregarded when a job joint is performed. As jobs in the joint queue are automatically joined, it is arranged to describe the name of user and data of print on the header of each sheet in order to define each of the users and jobs that have been printed, respectively. Further, on the upper part of each page placed side by side in the mode of 4-in-1, it is arranged to describe the page number of a specific job accordingly. Moreover, in order to make the boundary of each job clear, it is separated by thick lines, respectively.

Third Embodiment—Instructing a Job Joint from an Operating Unit

In accordance with the first embodiment, a job joint is instructed in the image processing apparatus by the application of the job description by the JDL. However, in a third embodiment of the present invention, a structure is arranged so that a job joint is instructed through the operating unit of the image processing apparatus. Also, as one of jobs to be joined, image data read out by means of the image reader of a color copying machine, which serves as the image formation apparatus 1, are regarded as a printing job among those printing jobs per se, and the structure is arranged to include such image data in a job joint. The description will be omitted as to the same portions as those of the first embodiment. In conjunction with FIG. 17, FIG. 18, FIG. 19A, 19B and FIG. 20, the description will be made of those portions that differ from the first embodiment.

Figure 17:
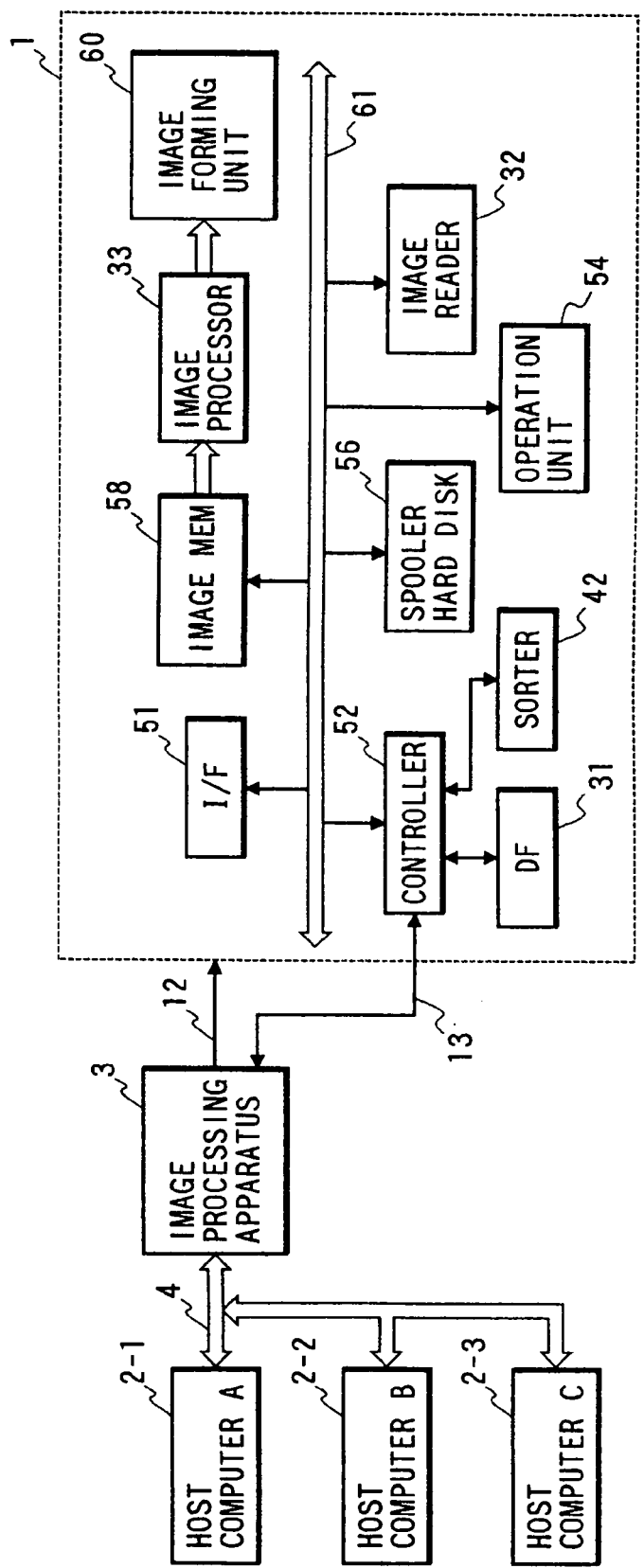
FIG. 17 is a block diagram which shows an image processing apparatus in accordance with a third embodiment of the present invention.

FIG. 17 is a block diagram which shows the image formation system comprising an image processing apparatus 3 and an image forming apparatus 1 dealing with the color PDL in accordance with a third embodiment of the present invention.

The PDL data transferred from a host computer through a network 4 are developed to the raster image data in the image processing apparatus 3, and transferred to the image forming apparatus 1 as raster image data 12. The raster image data are formed by a total of 24 bits, 8 bits each of RGB per pixel. The raster image data 12 thus transferred are held in a spooler hard disk 56 as they are through an external interface circuit 51. The spooler hard disk 56 has a sufficient capacity of holding raster image data of plural page portions. The raster image data thus retained in the spooler are read out in a certain condition and written on an image memory 58. The RGB data written on the image memory 58 are read out and converted by an image processor 33 into YMCK image data, thus being transferred to an image formation unit 60 where an image formation is executed.

As described in conjunction with FIG. 3, the image reader 32 is to read documents and obtain RGB data. When the image forming apparatus 1 functions as a copying machine, the RGB data, which are read out by the image reader 32, are once held on the spooler hard disk 56, and then, transferred to the image memory 58 and read out for printing.

The controller 52 is to control the entire system of the image forming apparatus 1. In addition to communicating with the image processing apparatus 3, it controls the DF (automatic document feeder) 31, spooler sorter 42 and others described in conjunction with FIG. 3. The operating unit 54 is to instruct the set up of various modes of copying operation and the start of copying. Also, as described later, it instructs a job joint. Here, a reference numeral 61 designates a CPU bus to connect these units.

Figure 18:
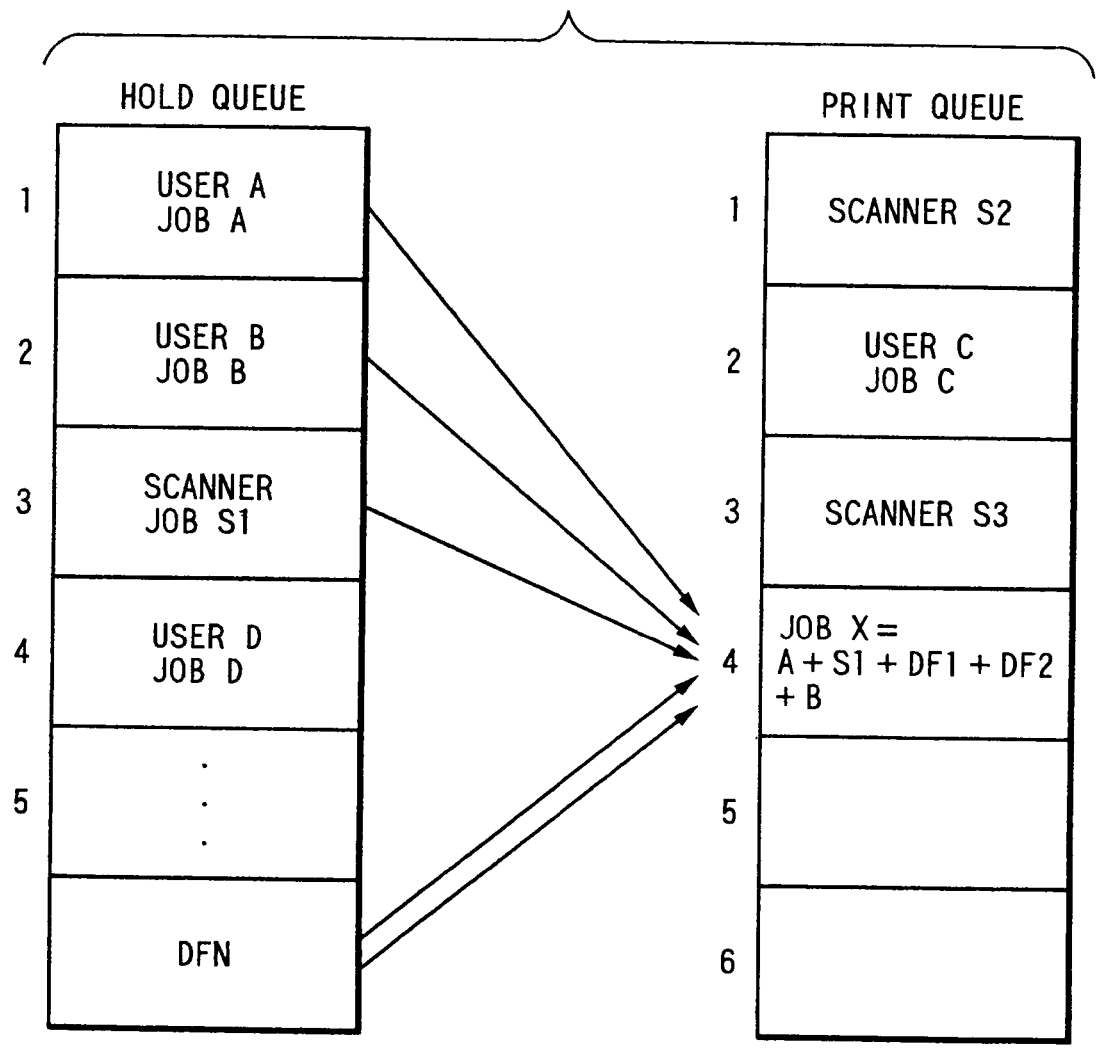
FIG. 18 is a view which shows the structure of a queue in accordance with the third embodiment.

FIG. 18 is a view which illustrates the state of job distribution on the spooler disk 56. In accordance with the present embodiment, two kinds of queues, printing and holding, are provided for the spooler hard disk 56. These queues function as in the first embodiment with the exception of the printing jobs existing in the queues, which are prepared to deal with raster images. However, in these queues, there are mixed jobs of a copying machine that prints images read out by the image reader (copying jobs) in addition to the printing jobs per se that have been transferred from a host computer through the image processing apparatus.

In FIG. 18, there is at first a job S1, which is mixed in the holding queue to deal with the image data read out by a scanner as a printing job by a copying machine in addition to the printing jobs per se, namely, the job A, job B, and job D. Further, there is a job DFn that indicates each of the documents stacked on the DF (automatic document feeder) 31, which virtually resides in the holding queue. The suffix n of the DFn indicates an nth document. This job, DFn, does not retain any image data as an entity on it, but it indicates an image data that should be obtainable if an nth document is read out from among those stacked on the DF.

On the other hand, there also mixed in the printing queue the copying jobs S2 and S3, in addition to the job C, which is a printing job per se. These are transferred to the image memory 58 beginning with a job at the head of this queue and printed one after another. In accordance with the present embodiment, both printing and copying jobs are performed in the same preferential order, but since a copying job requires more instanteneity than a printing job, it may be possible to arrange a structure so that the priority is given to a copying job.

In accordance with the present embodiment, jobs to be joined are arranged in the holding queue. The jobs in the holding queue are selected for a job joint. The jobs thus joined are transferred to the printing queue for printing when arrive at the head thereof. In FIG. 18, the jobs A, B, S1, DF1, and DF2 are joined, and the job joint X is transferred to the printing queue. In other words, the job A transferred from a computer, the job S1 read out by the scanner as a copying job, the job DF1 that indicates the first document on the DF, the job DF2 that indicates the second document on the DF, and the job B transferred from a computer are joined in that order and transferred to the printing queue for printing. In this way, the printing jobs per se and copying jobs are executed as a job joint. Therefore, as described in conjunction with the first embodiment, these jobs can be printed continuously or both of them can be mixed to execute a 4-in-1 printing, a duplex printing, and others.

In accordance with the present embodiment, the job joint is performed by the operator by issuing instructions accordingly through the operation unit 54 of the image forming apparatus. FIGS. 19A and 19B are views which illustrate the messages appearing on the screen of the liquid crystal display panel (not shown) of the operation unit 54. On liquid crystal display panel, touch keys are arranged. When a job joint key (not shown) on the operation unit is depressed, a screen represented in FIG. 19A appears on the liquid crystal display panel. On the upper part of the screen shown in FIG. 19A, operational messages appear, and on the lower part thereof, a list appears to indicate jobs retained in the holding queue. The number of jobs to be joined is inputted by use of ten keys, and then, the OK key on the panel is depressed. On the middle part of the screen shown in FIG. 19A, the job numbers for which the job joint is requested are indicated in order of those being joined. With the completion of all the instructions required, the exit key is depressed.

On the other hand, in order to set each of the modes applicable to a job joint, the mode setup key appearing on the screen represented in FIG. 19A is depressed. Then, the screen changes to the one shown in FIG. 19B. The setting mode is selected by moving the cursor by use of the up/down key (not shown), and then, the desired numbers are entered by use of the ten key as to the upper two modes, and each of the on and off modes is switched over by use of the left/right key (not shown) for the lower four modes. In this respect, the up/down key, although not shown, may be an arrow-shaped key, that serves as a zooming key or a density adjustment key, provided for the operation panel of a copying machine or the like. The modes that can be set in FIG. 19B are six. It is possible to indicate the number of printing sheets for the current job joint; the numeral of N for the mode of N-in-1; the requirements of a duplex printing, of a sort printing, of a spool printing, and of a composition printing from the top, respectively. Here, if 1 is inputted as the N for the N-in-1 mode, the set up is made for an ordinary printing where one page is printed on one sheet.

Figure 20:
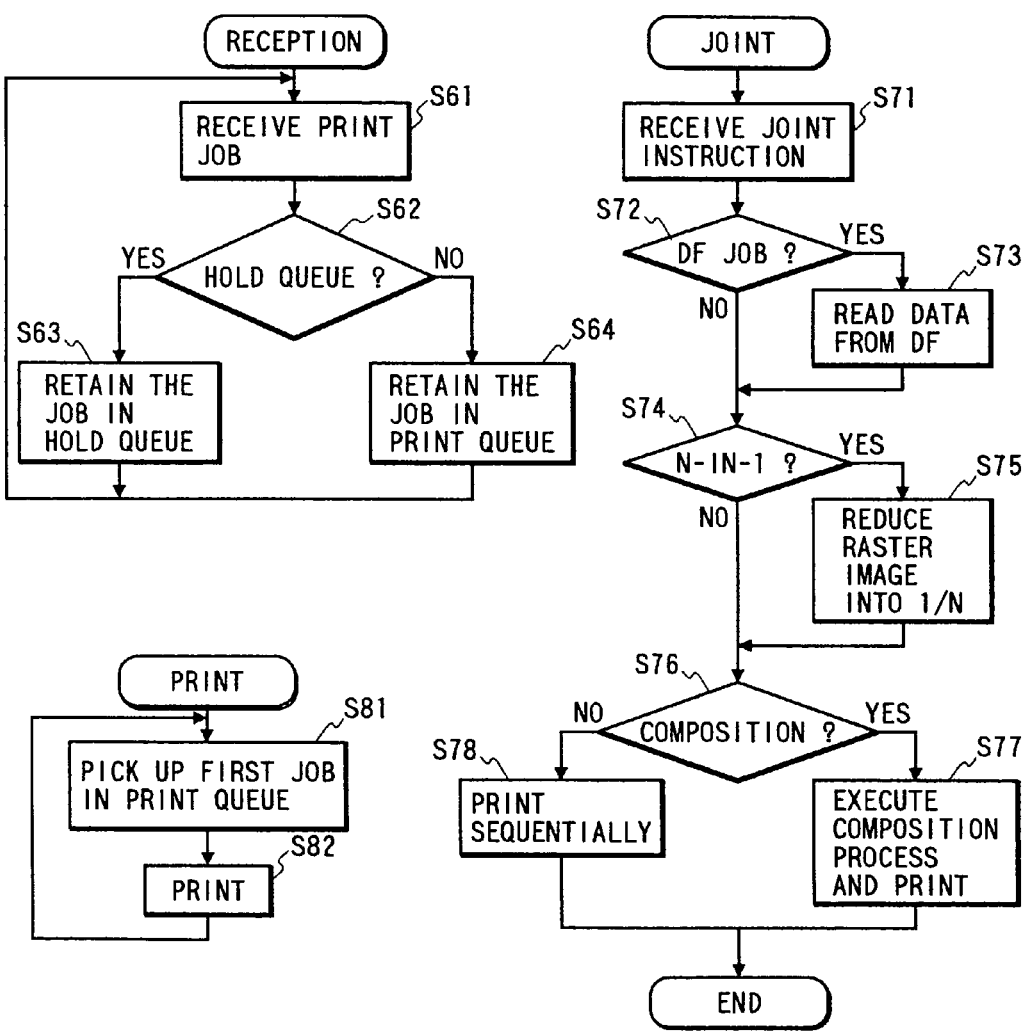
FIG. 20 is a flowchart used for the image processing apparatus in accordance with the third embodiment.

FIG. 20 is a flowchart which illustrates the control flow of the image forming apparatus 1 in accordance with the third embodiment. At first, in S61, the reception task begins receiving communication from the image processing apparatus 3 if there are printing jobs in it. Then, in S62, it is determined whether or not the holding queue is designated for such printing jobs. If affirmative, the jobs are held in the holding queue in S63. If negative, the jobs are held in the printing queue in S64.

Then, in S81, the printing task picks up a job at the head of the printing queue. In S82, each of the pages retained in the job is transferred to the image memory 58 one after another for printing. After that, the process returns to the S81.

Now, the description will be made of the job joint process execution task, which is actuated when the job joint key (not shown) of the operation unit is depressed. For the job joint process execution task, the screens of the liquid crystal panel of the operation unit are displayed in S71, at first, as shown in FIGS. 19A and 19B in order to receive job joint instructions from the operation unit. Then, when the exit key is depressed, it is determined whether or not any DF jobs, that is, job DFn, are included in the job joint in S72. If affirmative, the DF is controlled in S73 to read documents on the DF one after another, and then, substances of image data thus read out are being held in the holding queue. Thereafter, the DF jobs are handled in the same way as handling the copying jobs.

Then, in S74, it is determined whether or not the job joint should be printed in the mode of N-in-1. If affirmative, the raster image data that form each of the pages are contracted to 1/N in S75. For example, if the mode is 4-in-1, an image is contracted to a ½ high, and a ½ wide, thus to a ¼ square measure.

Subsequently, in S76, it is determined whether or not any composition-joint is executed for the jobs. If affirmative, the jobs are being printed together with the composition processing in S77. More specifically, in the S77, each of the pages that should be composed is substituted on the image memory 58 one after another for composition. When images on the second pages and are substituted on the image memory, no white data are written on the memory. As a result, on the image memory 58, images are composed by the images on each of the pages included in the job joint, which are overlaid one after another with the exception of white data. When the substitutions of all the jobs are completed for the composition joint, the image data on the image memory 58 are transferred to the image formation unit to form images.

On the other hand, if no composition joint is executed, each of the pages in the jobs that have been joined in the S78 are printed one after another. More specifically, image data corresponding to each of the pages are written on the image memory 58, and then, read out and transferred to the image formation unit to form images. In case of the N-in-1 printing mode, images on each of the corresponding N pages are written on the N numbers of areas of the image memory 58, and then, printed accordingly. Also, preceding to the printing, the duplex mode, sort mode, staple mode, and number of sheets set up on the screen shown in FIG. 19B are notified to the image formation unit 60. In accordance with the notified modes, the respective job joint is printed accordingly.

Fourth Embodiment—Job Joint Instruction Through the Operation Unit of an Image Processing Apparatus Between a Host Computer and a Printer In accordance with the first and second embodiments, a job joint is executed when developing the PDL jobs into raster images for its transfer to a printer, and in accordance with the third embodiment, a job joint is executed after the development into raster images. However, in accordance with a fourth embodiment of the present invention, a structure is arranged so that a job joint is executed at the PDL level. Also, while a job joint is instructed using the JDL job for the first embodiment, jobs are automatically joined for the second embodiment, and a job joint is instructed through the operation unit of an image forming apparatus for the third embodiment, a structure is arranged for the fourth embodiment to instruct a job joint through the operation unit of an image processing apparatus. The description of the same portions as those of the first embodiment will be omitted. Here, in conjunction with FIG. 21 and FIGS. 22A and 22B, the description will be made of the portions that differ from the first embodiment.

Figure 21:
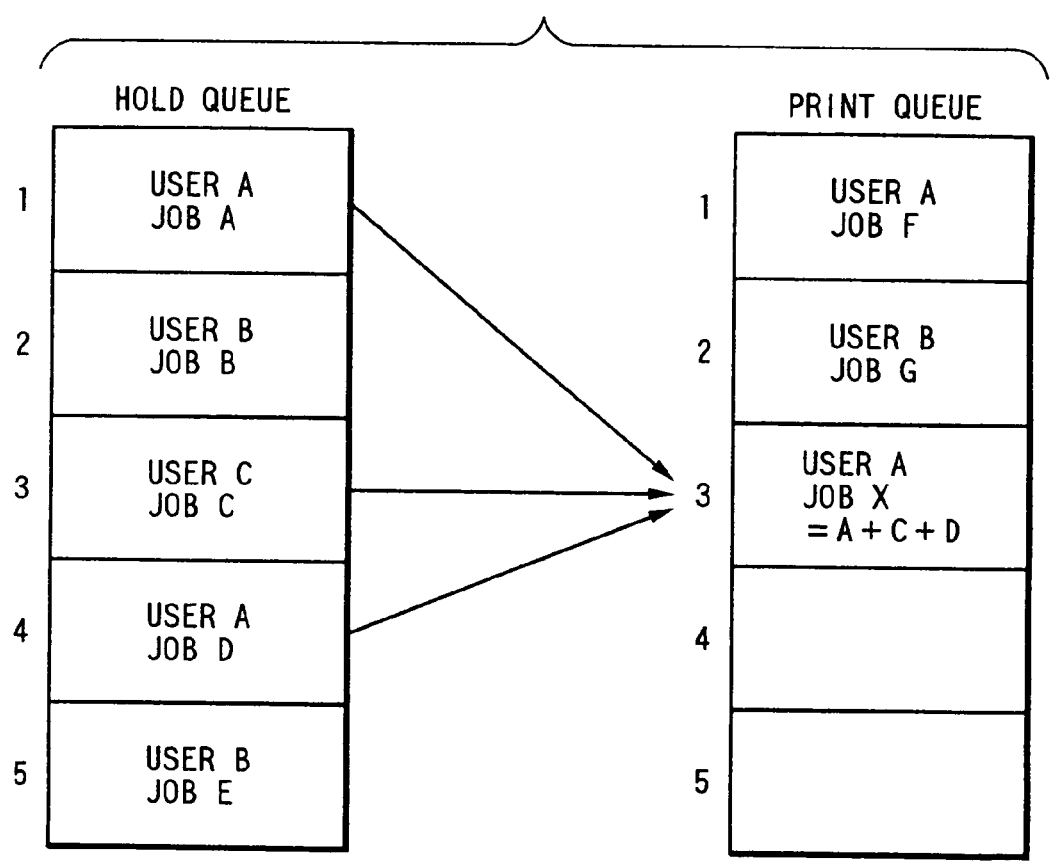
FIG. 21 is a view which shows the structure of a queue in accordance with a fourth embodiment of the present invention.

FIG. 21 is a view which illustrates queues arranged for the spooler in an image processing apparatus 3 in accordance with the fourth embodiment. As in the first embodiment, a holding que and a printing queue are arranged. The objects of its provisions are the same as that of the first embodiment. For the fourth embodiment, the jobs to be joined are held in the holding queue, and a job joint is executed by instructions issued through the operation unit in the image processing apparatus 3. FIG. 21 is a view which illustrates a state where the jobs A, C, and D are joined, and then, a job joint X is being transferred to the printing queue. For the first embodiment, the job joint is executed along each of the pages being developed for printing when a JDL job arrives at the head of the printing queue. For the present embodiment, however, a job joint is executed immediately when an instruction is issued through the operation unit therefor, and a job joint is transferred to the last of the printing queue. This job joint processing is performed by generating one PDL data by joining the PDL data for plural jobs to be joined one after another. The PDL data thus generated is handled as a job joint.

FIG. 22A is a view which shows a screen used for instructing a job joint, which is displayed on the operation unit in the image processing apparatus 3. The operator inputs the number of jobs to be joined through the ten keys, and then, depresses the OK key. If certain jobs are selected for a job joint and an ID number has been set for such jobs, the screen changes to the one represented in FIG. 22B where the user is requested to input such ID. This is devised so that no other users can freely put jobs together. Here, in accordance with the present embodiment, an ID is set for each of the jobs. It is devised that the IDs are transferred from a host computer together with a printing job if any protection is needed by use of IDs. However, it may be possible to set IDs per user or to adopt a method whereby to register IDs per user in the image processing apparatus 3.

Fifth Embodiment—Performing a Continuous Printing by Means of a Virtual Job Joint In accordance with the first embodiment, jobs are joined explicitly, and then, a continuous printing, a duplex printing, a 4-in-1 printing, a sort printing, and others are executed as the case may be. For a fifth embodiment, however, a structure is arranged to automatically or virtually provide a job joint for a continuous printing. The description of the same portions as those of the first embodiment will be omitted. Here, in conjunction with FIG. 23 and FIG. 24, the description will be made of the portions that differ from the first embodiment.

The fifth embodiment is structured to aim at providing a virtual job joint for a continuous printing so as to make processing time shorter for plural jobs as a whole as described in conjunction with FIGS. 6A and 6B. At the same time, it is aimed at avoiding any influences given to the result of each job processing because of the explicit job joint. In other words, it is devised so that there is no difference in the result of printing whether each of the jobs are joined or not.

Figure 23:
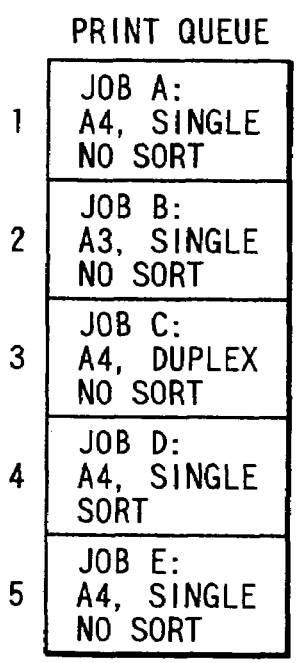
FIG. 23 is a view which shows a queue in accordance with a fifth embodiment of the present invention.

FIG. 23 is a view which illustrates a printing queue arranged for a spooler in accordance with the fifth embodiment. This queue may be a holding one as in the first embodiment, but the virtual job joint for the present embodiment is assumed to be executed for the jobs retained in the printing queue as its object. In FIG. 23, five printing jobs are retained in the printing queue. Each of the jobs is different in the modes as to the size of sheet, single or duplex, sort or non-sort, among some others. In accordance with the first, third, and fourth embodiments, the job joint is executed by the instruction issued by the user. Therefore, whether or not any jobs having different printing modes are put together depends on the user who issues instructions for such job joint. Usually, the printing jobs having the same printing mode are put together. Also, even when printing jobs are joined with different printing modes, it is possible to designate a printing mode applicable to a job joint. For example, in case of the JDL, a JDL mode, which is applicable to the entire job, is applied in order to make the printing modes agreeable with each of the jobs involved. Meanwhile, in accordance with the second embodiment, jobs are automatically joined. Therefore, the printing modes of job joint are fixed for a certain specific mode unconditionally. As has been described, if printing modes change, the result of a processed printing job is caused to differ from the original one inevitably. Therefore, for the present embodiment, in order to remove such cause, it is arranged to automatically pick up only the jobs that can be printed continuously without changing printing modes for the intended continuous printing. The combination of jobs that admits of a continuous printing without changing printing modes is dependent on the structure of a printer to be used. However, in accordance with the present embodiment, a continuous printing is made possible only when each of the modes of sheet size and single or duplex is the same for non-sorting. This arrangement is necessary because if the sizes of sheets are different, there is a need for changing sheet feeder cassettes during a continuous printing. Also, for a duplex printing and a single printing, the destinations of delivery trays are different, thus making its control more complicated. Also, if sorting jobs themselves are joined automatically, the sorted jobs are mixed on the delivery tray as shown in FIGS. 9A and 9B, thus the user being required to separate them manually after all. Here, in accordance with the example shown in FIG. 23, the job A and job E are a job combination that enables a continuous printing without changing printing modes.

Figure 24:
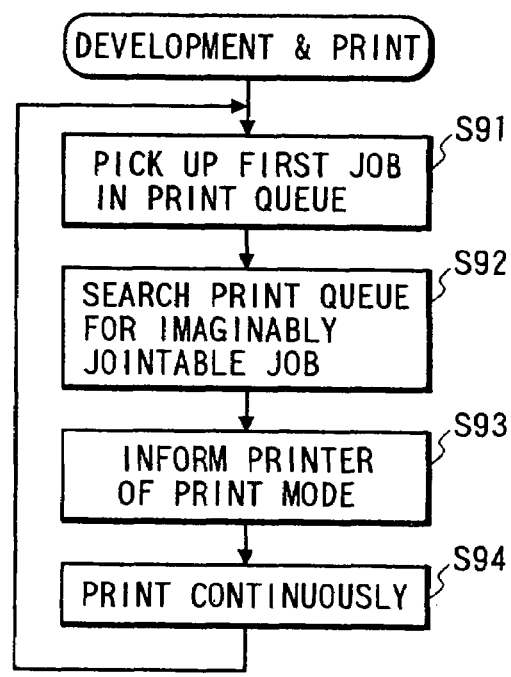
FIG. 24 is a flowchart used for the image processing apparatus in accordance with the fifth embodiment.

FIG. 24 is a flowchart which illustrates the control flow of the image processing apparatus 3 in accordance with the fifth embodiment. This flowchart corresponds to the one used for the development and printing task for the first embodiment described in conjunction with FIG. 12. For the fifth embodiment, the development and printing tasks are, at first, to pick up a job at the head of the printing queue in S91. Here, in accordance with the example shown in FIG. 23, the job A is picked up. Then, in S92, such job and the jobs that enable a virtual job joint are retrieved from among those retained in the printing queue. The jobs that enable a virtual job joint are jobs that make it possible to execute a continuous printing without changing modes as described above. In accordance with the example shown in FIG. 23, the job E is retrieved. Then, in S93, the printer is notified of the printing modes of the entire jobs that have been virtually joined. In accordance with the example in FIG. 23, the modes thus notified are A4, single, and non-sort.

Then, in S94, the job A and job E, which are virtually joined, are printed in succession as described in conjunction with FIGS. 6A and 6B.

In case of a printer used for the present embodiment, it is possible to execute a virtual job joint on condition that the sizes of sheets used for printing are the same and the modes of single or duplex are the same for non-sorting, but if a printer that can change sheet feeder cassettes during a continuous printing, it is possible to execute a virtual job joint on condition that the single or duplex modes are the same for non-sorting. This is also an embodiment. In such a case, the jobs A, B, and E can be virtually joined for a continuous printing in accordance with the example shown in FIG. 23. The same is applicable to the single or duplex mode. If a printer to be used is capable of switching the delivery trays at each destination of deliveries during a continuous printing, it is possible to execute a virtual job joint even if the modes of single or duplex are different. This is also one of the embodiments. Further, regarding the sorting mode, if delivery trays at the destination of non-sorting and that of sorting are different, it is possible to execute a virtual job joint for a plurality of non-sorting jobs and one sorting job. This is also one of the embodiments. Also, if a sufficient number of trays are available at the destinations when sorting is executed, a plurality of sorting jobs can be virtually joined by arranging a structure so that a control is made to group the trays at destinations per job and avoid any mixture of sorted sheets between jobs. This is also another one of the embodiments.

Other Embodiments

In accordance with the embodiments described above, the image data transferred from a host computer are received in the PDL data format. The features of this format are such that character data, graphic data, and raster image data can be handled uniformly, but it also constitutes one of the embodiments that instead of the PDL data, only raster image data are received and written on the image memory. In this case, any complicated development processing is not needed for execution. As a result, there is no need for the provisions of high speed CPU, ROM, RAM, and others, thus making it possible to keep costs at a lower level.

Also, for the embodiments described above, the raster image data are developed on the image memory or held on the spooler hard disk as they are. This contributes to making the hardware structure simpler. However, instead of developing them as they are, it may be possible to hold them on the image memory or the spooler hard disk after giving them some compression process. This is also one of the embodiments. In this case, the hardware structure becomes more complicated, but it is possible to reduce the size of memory efficiently.

In accordance with each of the embodiments described above, image data, such as PDL data, are received by communicating with an external host computer or the like. It also constitutes another one of the embodiments if an arrangement is made so as to receive image data from an inner floppy disk. Here, instead of a floppy disk, a hard disk or the like is adoptable for the same purpose. Also, it may be possible to receive PDL data produced by use of an application program (not shown) on the main memory or transfer it therefrom.

Also, in accordance with each of the embodiments described above, the image forming apparatus 1 is provided separately from the image processing apparatus 3, but it may be possible to provide them together.

FIG. 25 is a view which shows a state where a program with respect to the present embodiment is loaded on a server installed on a network through a storage medium, and at least, an index, a reception task, a development printing task, and a joint task described earlier are stored on the storage medium.

When the functions of the image processing apparatus of the present embodiment are executed by means of a host computer such a server installed on the network, it is also possible to apply the present invention even if such functions are supplied to the host computer, an image forming apparatus, or an image processing apparatus by loading a group of information including the program through a FD, a CD-ROM, flash memory or other memory means, or through a network.

In this way, a job joint is possible. In the meantime, if any conflicts take place among the jobs, the one designated last is validated. As described above, when a job joint is performed, it is determined whether or not the numbers of pages are more than a portion of one output sheet. If affirmative, the job joint is possible.

As described above, it is possible to instruct a job joint through a operation panel on the printer side.

As described above, it is possible to provide a storage medium for storing tasks that perform a job joint.

Also, the present invention is applicable to a system comprising a plurality of equipment or to an apparatus having one equipment. It is of course possible to apply the present invention even when a program is supplied to a system or an apparatus for its implementation. In this case, a storage medium that stores a program embodying the present invention is regarded as a constituent of the present invention. Then, by reading out such program from the storage medium to a system or an apparatus, it is made possible for the system or the apparatus to operate in such a manner as predetermined by the program.

As has been described above, in accordance with the present invention, there is an effect to provide an apparatus for controlling image processing capable of applying the various processes, which have been applied per job, to a plurality of printing jobs as a whole by joining and regarding them as one job, and to provide a method for controlling image processing as well.

What is claimed is:

1. An image processing apparatus, connected to a host computer, for controlling image processing, said apparatus comprising:
   reception means for receiving one or more print jobs from the host computer, each print job including a plurality of logical pages and a logical page number indicating a number of logical pages to be arranged on one side of a print sheet, the logical page number being designated as a page layout;
   spool means for spooling the print jobs received by said reception means;
   input means for inputting a joining instruction that specifies a plurality of print jobs among the print jobs spooled by said spool means to be joined into one joint print job, and that instructs a logical page number indicating a number of logical pages to be arranged on one side of a print sheet as a page layout for the joint print job such that a plurality of pages of the one joint print job are printed on one side of a print sheet;
   joining means for, based on the joining instruction input by said input means, joining the specified print jobs into the one joint print job; and
   print means for printing the one joint print job joined by said joining means,
   wherein said joining means executes the joining process using the logical page number instructed as the page layout for the one joint print job without using the logical page numbers designated in the specified print jobs joined by said joining means.

2. The apparatus according to claim 1, wherein the print unit has a duplex print function, and wherein if the joining mode designates a duplex print mode, said joining means joins the specified print jobs into the one joint print job such that predetermined pages included in respective different print jobs can be printed on respective different sides of one print sheet.

3. The apparatus according to claim 1, wherein if the joining mode designates an N-in-1 print mode, said joining means joins the specified print jobs into the one joint print job such that predetermined pages included in different print jobs can be printed on the same side of one print sheet.

4. The apparatus according to claim 1, wherein said joining means joins the specified print jobs into the one joint print job such that at least one page included in one print job can be inserted between a plurality of pages included in another print job.

5. The apparatus according to claim 1, further comprising image reading means for reading image data, wherein said joining means joins the specified print jobs into the one joint print job by handling the image data read by said image reading means as one type of print job.

6. The apparatus according to claim 1, wherein the print job includes at least one of a duplex print mode, a sort print mode, asort staple print mode, and an N-in-1 print mode.

7. A method of controlling image processing for an image processing apparatus connected to a host computer, the method comprising the steps of:
   receiving one or more print jobs from the host computer, each print job including a plurality of logical pages and a logical page number indicating a number of logical pages to be arranged on one side of a print sheet, the logical page number being designated as a page layout;
   spooling the print jobs received in said receiving step;
   inputting a joining instruction that specifies a plurality of print jobs among the print jobs spooled in said spooling step to be joined into one joint print job, and that instructs a logical page number indicating a number of logical pages to be arranged on one side of a print sheet as a page layout for the joint print job such that a plurality of pages of the one joint print job are printed on one side of a print sheet;
   joining, based on the joining instruction input in said inputting step, the specified print jobs into the one joint print job; and
   printing, via a printer, the one joint print job joined in said joining step,
   wherein said joining step executes the joining process using the logical page number instructed as the page layout for the one joint print job without using the logical page numbers designated in the specified print jobs joined by said joining means.

8. The method according to claim 7, wherein the printer has a duplex print function, and wherein if the joining mode designates a duplex print mode, the specified print jobs are joined in said joining step into the one joint print job such that predetermined pages included in respective different print jobs can be printed on respective different sides of one print sheet.

9. The method according to claim 7, wherein if the joining mode designates an N-in-1 print mode, the specified print jobs are joined in said joining step into the one joint print job such that predetermined pages included in different print jobs can be printed on the same side of one print sheet.

10. The method according to claim 7, wherein the specified print jobs are joined by said joining means into the one joint print job such that at least one page included in one print job can be inserted between a plurality of pages included in another print job.

11. The method according to claim 7, further comprising the step of reading image data, wherein the specified print jobs are joined in said joining step into the one joint print job by handling the read image data as one type of print job.

12. The method to claim 7, wherein the print job includes at least one of a duplex print mode, a sort print mode, a sort staple print mode, and an N-in-1 print mode.

13. An image processing apparatus having a first storage area for storing print jobs to be printed in a predetermined order and a second storage area for storing print jobs to be printed in response to a print instruction entered independently of the print jobs, said image processing apparatus comprising:
   reception means for receiving a print job from a host computer, each print job including a plurality of logical pages and a logical page number indicating a number of logical pages to be arranged on one side of a print sheet, the logical page number being designated as a page layout;
   storage control means for controlling the second storage area to store the print job received by said reception means as a hold job in response to a hold designation for the print job;
   display control means for controlling a display unit to display a list of the print jobs stored as hold jobs in the second storage area;
   selection input means for entering a selection instruction specifying a plurality of print jobs to be joined among the list of print jobs displayed on the display unit;
   layout mode input means for entering a page layout for one joint print job obtained by joining the plurality of specified print jobs, a logical page number indicating a number of logical pages to be arranged on one side of a print sheet being designated as the page layout; and
   print control means for joining the plurality of print jobs specified by the selection instruction entered by said selection input means into the one joint print job in the page layout entered by said layout mode input means and for controlling a print unit to print the one joint print job,
   wherein said print control means executes the joining process using the logical page number designated as the page layout entered by said layout mode input means for the one joint print job without using the logical page numbers designated in the plurality of specified print jobs joined by said print control means.

14. The apparatus according to claim 13, wherein said print control means determines a page layout based on the print mode entered by said print mode input means such that predetermined pages of the specified print jobs are printed on the same side of one print sheet.

15. The apparatus according to claim 13, further comprising a third storage area for storing print jobs to be automatically printed when a certain condition is satisfied, wherein said print control means automatically joins a plurality of print jobs stored in the third storage area into the one joint print job and controls the print unit to print the one joint print job in response to the certain condition being satisfied.

16. The apparatus according to claim 13, wherein when the plurality of print jobs to be joined are specified, said selection input means requests input of a password for each print job, wherein said print control means joins the plurality of specified print jobs into one print job and controls the print unit to print the one joint print job after a proper password is input for each print job.

17. The apparatus according to claim 13, further comprising image reading means for reading image data, wherein said print control means joins the specified print jobs into the one joint print job by handling the image data read by said image read means as one type of print job.

18. The apparatus according to claim 15, wherein upon joining the plurality of print jobs stored in the third storage area into the one joint print job, said print control means joins the print jobs for a same user.

19. The apparatus according to claim 13, wherein the print job includes at least one of a duplex print mode, a sort print mode, a sort staple print mode, and an N-in-1 print mode.

20. An image processing method for an image processing apparatus having a first storage area for storing print jobs to be printed in a predetermined order and a second storage area for storing print jobs to be printed in response to a print instruction entered independently of the print jobs, said method comprising the steps of:
   receiving a print job from a host computer, each print job including a plurality of logical pages and a logical page number indicating a number of logical pages to be arranged on one side of a print sheet, the logical page number being designated as a page layout;
   storing the print job received in said receiving step in the second storage area as a hold job in response to a hold designation for that print job;
   displaying a list of the printjobs stored as hold jobs in the second storage area;
   specifying a plurality of print jobs to be joined among the list of print jobs displayed on the display unit;
   entering a page layout mode for the one joint print job obtained by joining the plurality of specified print jobs, a logical page number indicating a number of logical pages to be arranged on one side of a print sheet being designated as the page layout;
   joining the plurality of print jobs specified in said specifying step into one joint print job in the page layout entered in said layout step; and
   printing the one joint print job,
   wherein in said joining step, the print mode executes the joining process using the logical page number designated as the page layout entered by said layout mode input means for the one joint print job without using the logical page numbers designated in the plurality of specified print jobs joined in the joining step.

21. The method according to claim 20, wherein a page layout is determined based on the entered print mode such that predetermined pages of the specified print jobs are printed on the same side of one print sheet.

22. The method according to claim 20, wherein a plurality of print jobs to be automatically printed when a certain condition is satisfied are stored in a third storage area, the print jobs are joined automatically into the one joint print job, and the one joint print job is printed in response to the certain condition being satisfied.

23. The method according to claim 20, further comprising the step of requesting input of a password for each print job when the plurality of print jobs to be joined are specified, wherein the plurality of specified print jobs are joined into the one joint print job and the one joint print job is printed after a proper password is input for each print job.

24. The method according to claim 20, further comprising the step of reading image data, wherein the specified print jobs are joined into the one joint print job by handling the read image data as one type of print job.

25. The method according to claim 22, wherein upon joining the plurality of print jobs stored in the third storage area into the one joint print job, the print jobs are joined for a same user.

26. The method according to claim 20, wherein the print job includes at least one of a duplex print mode, a sort print mode, a sort staple print mode, and an N-in-1 printmode.

* * * * *

UNITED STATES PATENT AND TRADEMARK OFFICE
CERTIFICATE OF CORRECTION

PATENT NO. : 7,289,239 B2
APPLICATION NO. : 10/909432
DATED : October 30, 2007
INVENTOR(S) : Toshihiro Kadowaki It is certified that error appears in the above-identified patent and that said Letters Patent is hereby corrected as shown below:

ON THE COVER PAGE:
In item "(75) Inventor:" "Toshihiro Kadowaki, Kanagawa-ken (JP)" should read --Toshihiro Kadowaki, Kawasaki (JP) --.

IN THE DRAWINGS:
In "Sheet 13 of 24," "FIG. 13," in the box labeled "S33," "OVER WRITE" should read -- OVERWRITE --.

COLUMN 1:
Line 63, "documents" should read -- document --.

COLUMN 9:
Line 12, delete "whole".

COLUMN 11:
Line 9, "times" should read -- times be -- and "print out" should read -- printout --.
Line 42, "tics" should read -- tic --.

COLUMN 12:
Line 23, "that" should read -- that are --.

COLUMN 14:
Line 8, "arrive" should read -- arriving --.

COLUMN 15:
Line 32, "and" should be deleted.

COLUMN 20:
Line 35, "asort" should read -- a sort --.

COLUMN 22:
Line 7, "are" should read -- is --.
Line 39, "printjobs" should read -- print jobs --.

UNITED STATES PATENT AND TRADEMARK OFFICE
CERTIFICATE OF CORRECTION

PATENT NO. : 7,289,239 B2
APPLICATION NO. : 10/909432
DATED : October 30, 2007
INVENTOR(S) : Toshihiro Kadowaki It is certified that error appears in the above-identified patent and that said Letters Patent is hereby corrected as shown below:

COLUMN 23:
      Line 3, "are" should read -- is --.
      Line 4, "are" should read -- is --.

Signed and Sealed this

Nineteenth Day of August, 2008

JON W. DUDAS
*Director of the United States Patent and Trademark Office*